(12) United States Patent
Larocque et al.

(10) Patent No.: US 9,815,145 B2
(45) Date of Patent: Nov. 14, 2017

(54) FRAME ASSEMBLY FOR A VEHICLE

(71) Applicant: BOMBARDIER RECREATIONAL PRODUCTS INC., Valcourt (CA)

(72) Inventors: Bruno Larocque, St-Pie (CA); Simon Filion, St-Paul-d'Abbotsford (CA); Pascal Jacques, Valcourt (CA); Jean Guillemette, Valcourt (CA); David Brouillette, Drummondville (CA); David Rousseau, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/930,273

(22) Filed: Nov. 2, 2015

(65) Prior Publication Data

US 2016/0347366 A1    Dec. 1, 2016

Related U.S. Application Data

(60) Provisional application No. 62/073,602, filed on Oct. 31, 2014, provisional application No. 62/109,375, filed on Jan. 29, 2015.

(51) Int. Cl.
| | | |
|---|---|---|
| *B62D 23/00* | (2006.01) | |
| *B23K 31/02* | (2006.01) | |
| *B62D 27/02* | (2006.01) | |

(52) U.S. Cl.
CPC ............ *B23K 31/02* (2013.01); *B62D 23/005* (2013.01); *B62D 27/023* (2013.01)

(58) Field of Classification Search
CPC ...... B23K 31/02; B23P 15/00; B23P 2700/50; B23P 2700/023; B62D 21/02

(Continued)

(56) References Cited

U.S. PATENT DOCUMENTS 562,067 A    6/1896    Copeland
5,190,207 A    3/1993    Peck et al.
(Continued)

FOREIGN PATENT DOCUMENTS

WO    03021113 A1    3/2003
WO    2015114604 A1    8/2015

OTHER PUBLICATIONS

International Search Report of International Application No. PCT/IB2016/054893; Blaine R. Copenheaver; dated Dec. 12, 2016.

*Primary Examiner* — Pinel Romain
(74) *Attorney, Agent, or Firm* — BCF LLP

(57) ABSTRACT

A vehicle frame assembly has a first frame member defining a first frame member axis and a slot and having a first frame member connection portion adjacent the slot. A second frame member defining a second frame member axis has a projection and a second frame member connection portion adjacent thereto. The projection is received in the slot. The first frame member connection portion is connected to the second frame member connection portion to form a connection region in which the second frame member axis is disposed at a non-zero angle to the first frame member axis in the connection region. The method of assembling the frame includes inserting the projection into the slot, contacting the connection portions to each other to form the connection region with the members being positioned for connection with their axes disposed at a non-zero angle to each other, and connecting the connection portions.

20 Claims, 21 Drawing Sheets

(58) Field of Classification Search
USPC .......................................................... 296/205
See application file for complete search history.

(56) References Cited

U.S. PATENT DOCUMENTS

| | | | | |
|---|---|---|---|---|
| 5,249,818 | A | 10/1993 | Patterson | |
| 6,205,736 | B1* | 3/2001 | Amborn | B21C 37/294 |
| | | | | 296/203.01 |
| 6,539,604 | B2* | 4/2003 | Patelczyk | B62D 23/005 |
| | | | | 29/421.1 |
| 7,044,677 | B2 | 5/2006 | Moser et al. | |
| 8,915,530 | B2* | 12/2014 | Wagner | B23K 26/28 |
| | | | | 29/897.2 |
| 9,067,625 | B2* | 6/2015 | Morris | B62D 27/023 |
| 9,139,235 | B2* | 9/2015 | Craig | B62D 25/025 |
| 2006/0186699 | A1* | 8/2006 | Davis | B60G 3/06 |
| | | | | 296/187.01 |
| 2007/0295784 | A1* | 12/2007 | Chen | B23K 20/12 |
| | | | | 228/112.1 |
| 2008/0012311 | A1 | 1/2008 | Yamazaki et al. | |
| 2010/0164251 | A1* | 7/2010 | Itou | B62D 33/044 |
| | | | | 296/205 |
| 2015/0336612 | A1* | 11/2015 | Tyan | B21D 35/006 |
| | | | | 296/203.01 |

* cited by examiner

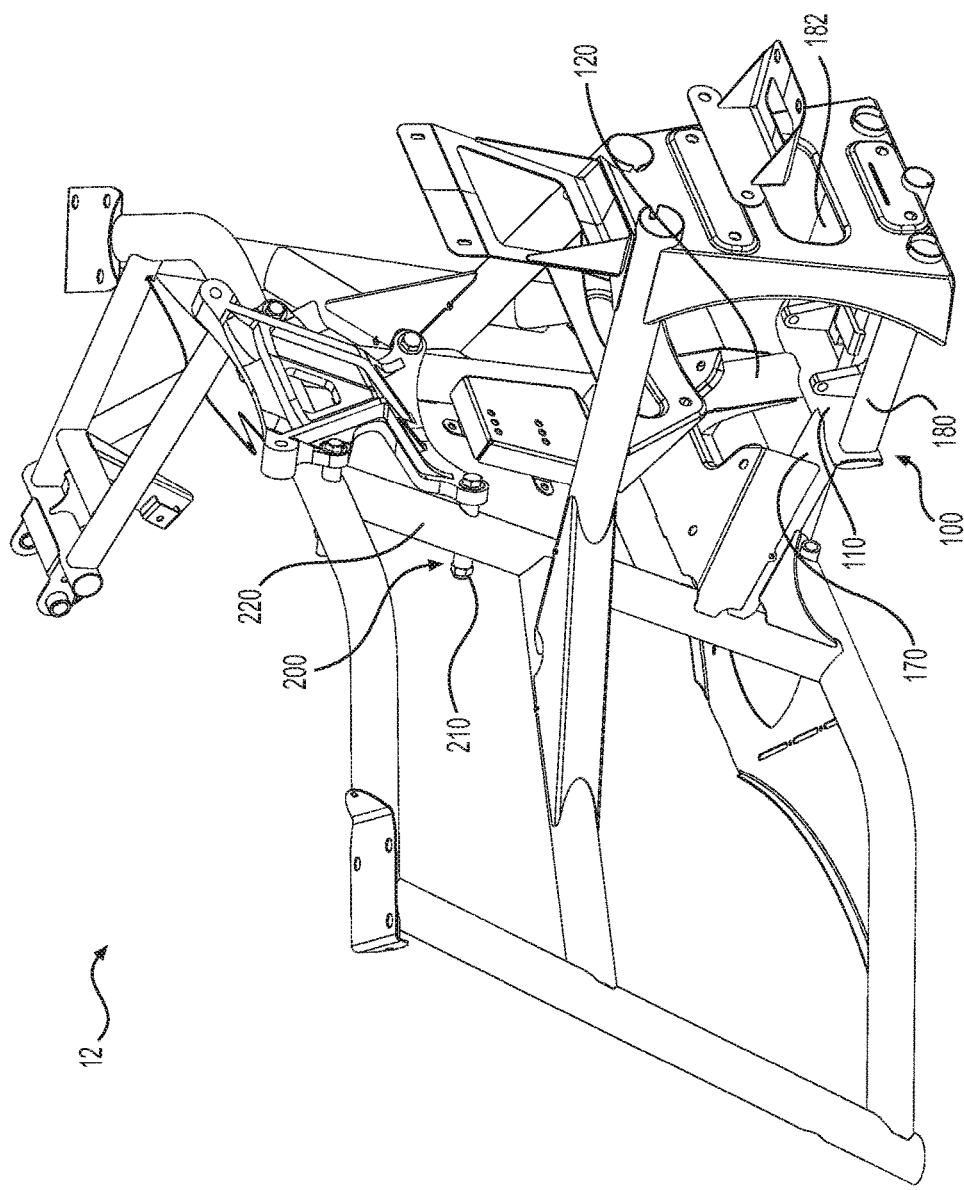

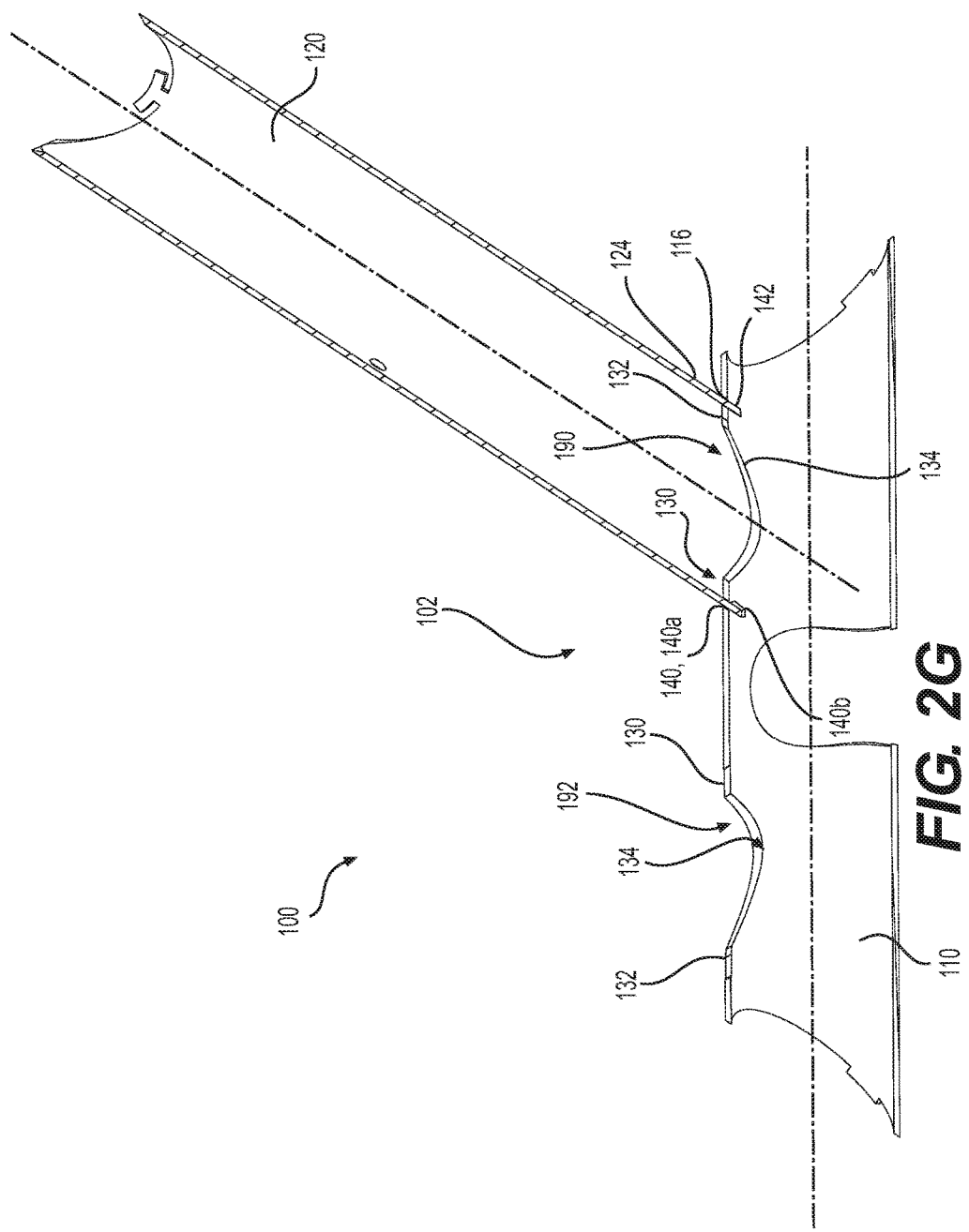

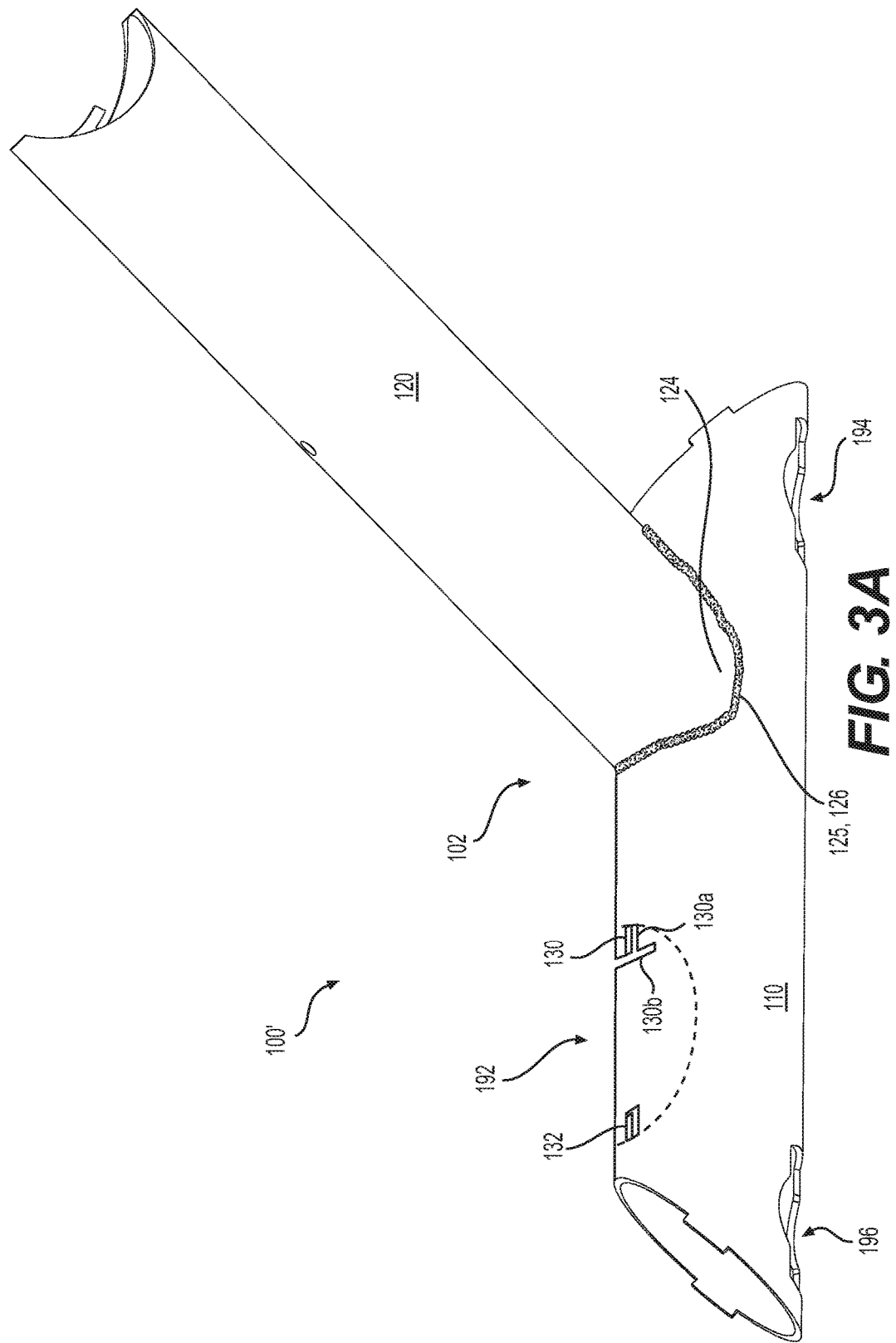

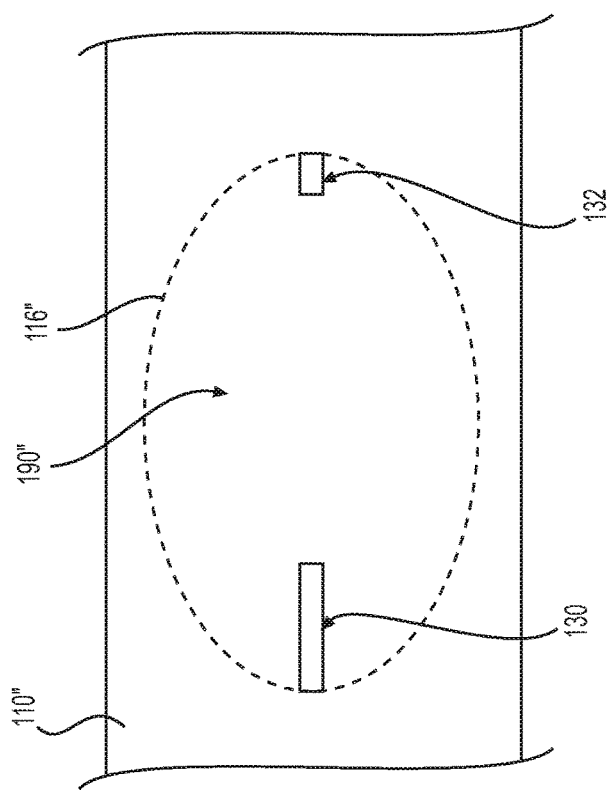
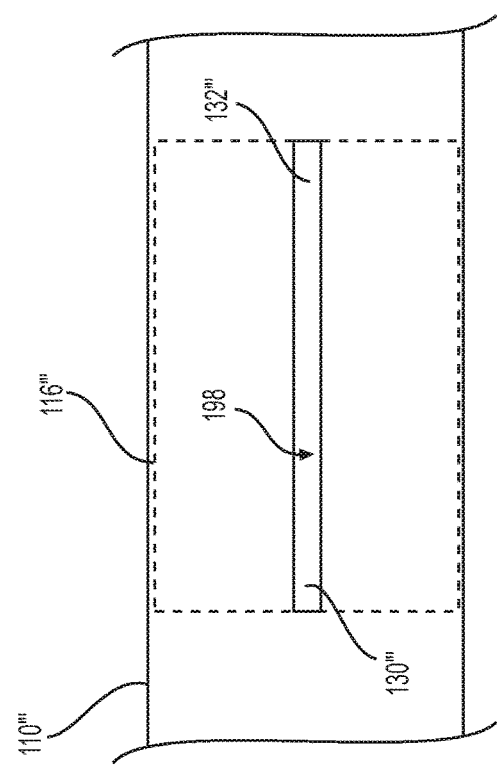
FIG. 3B
FIG. 3C

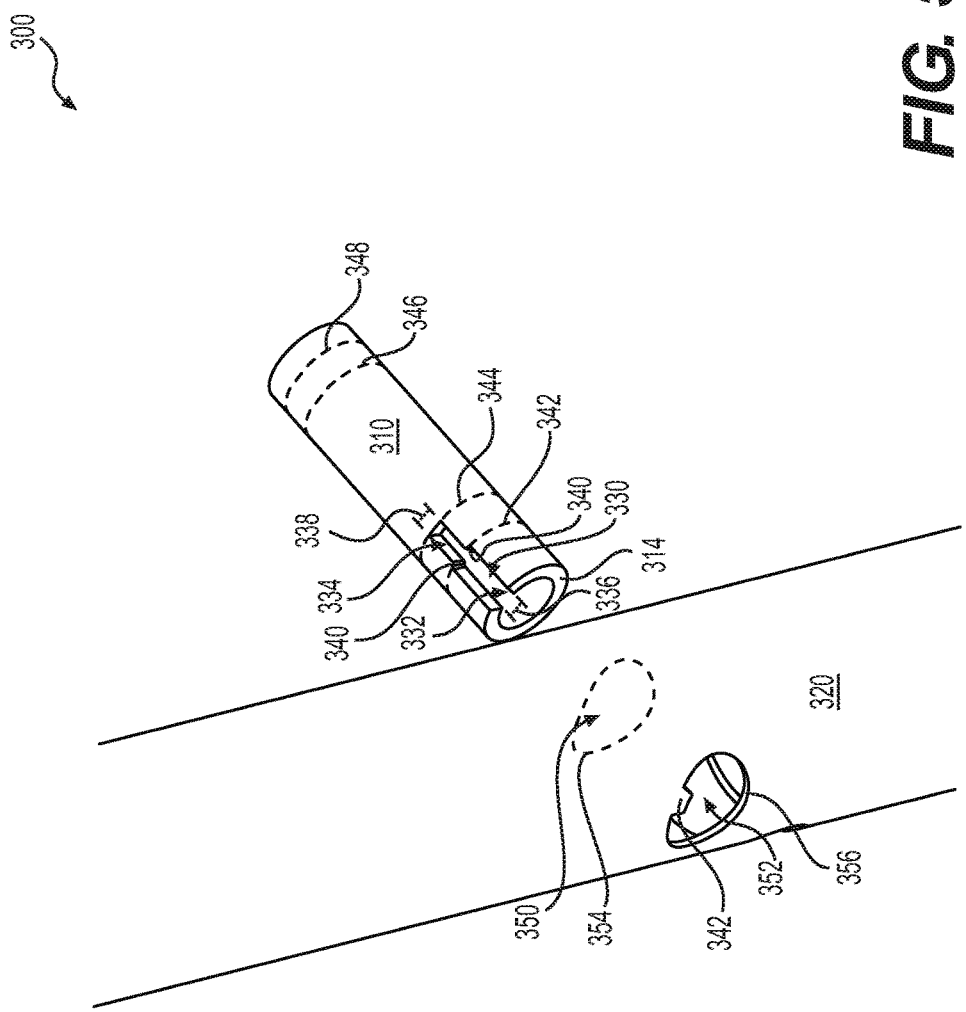

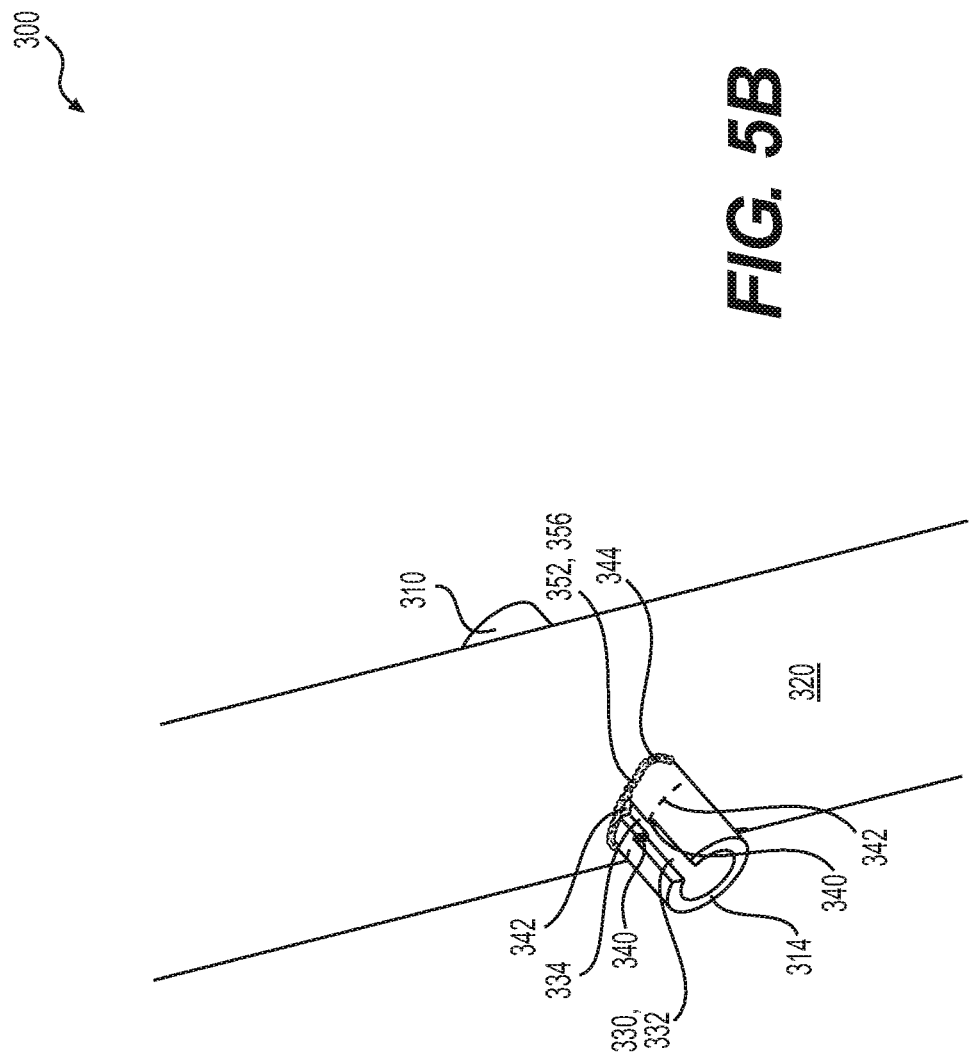

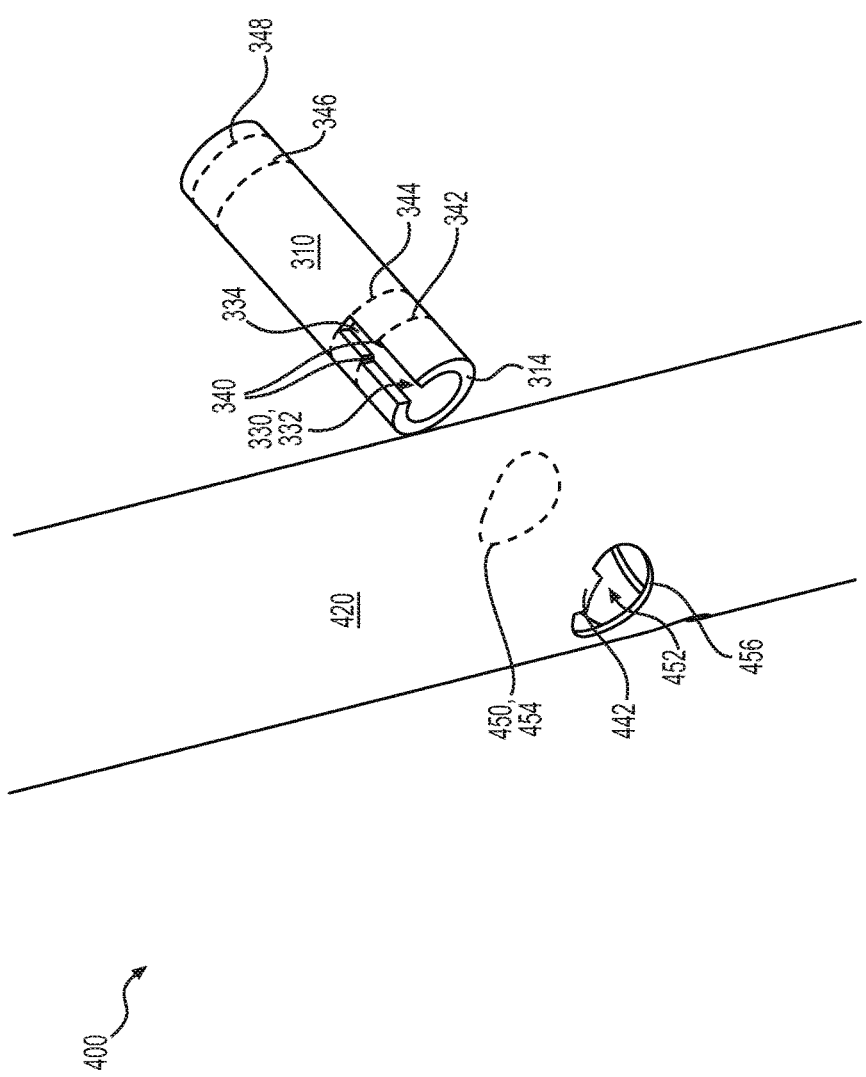

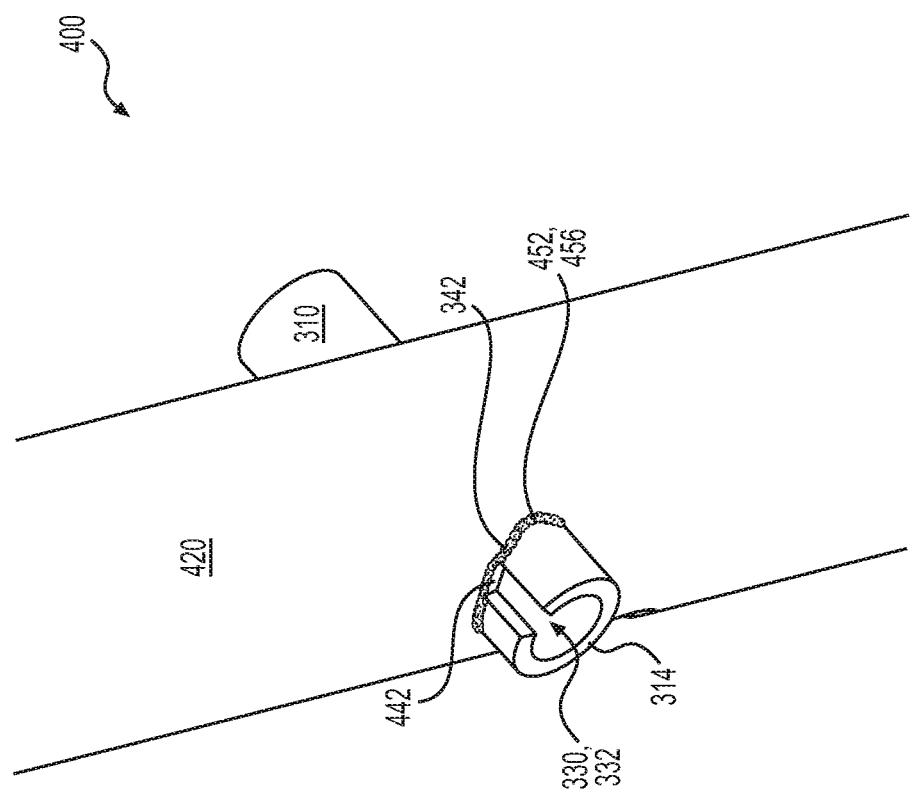

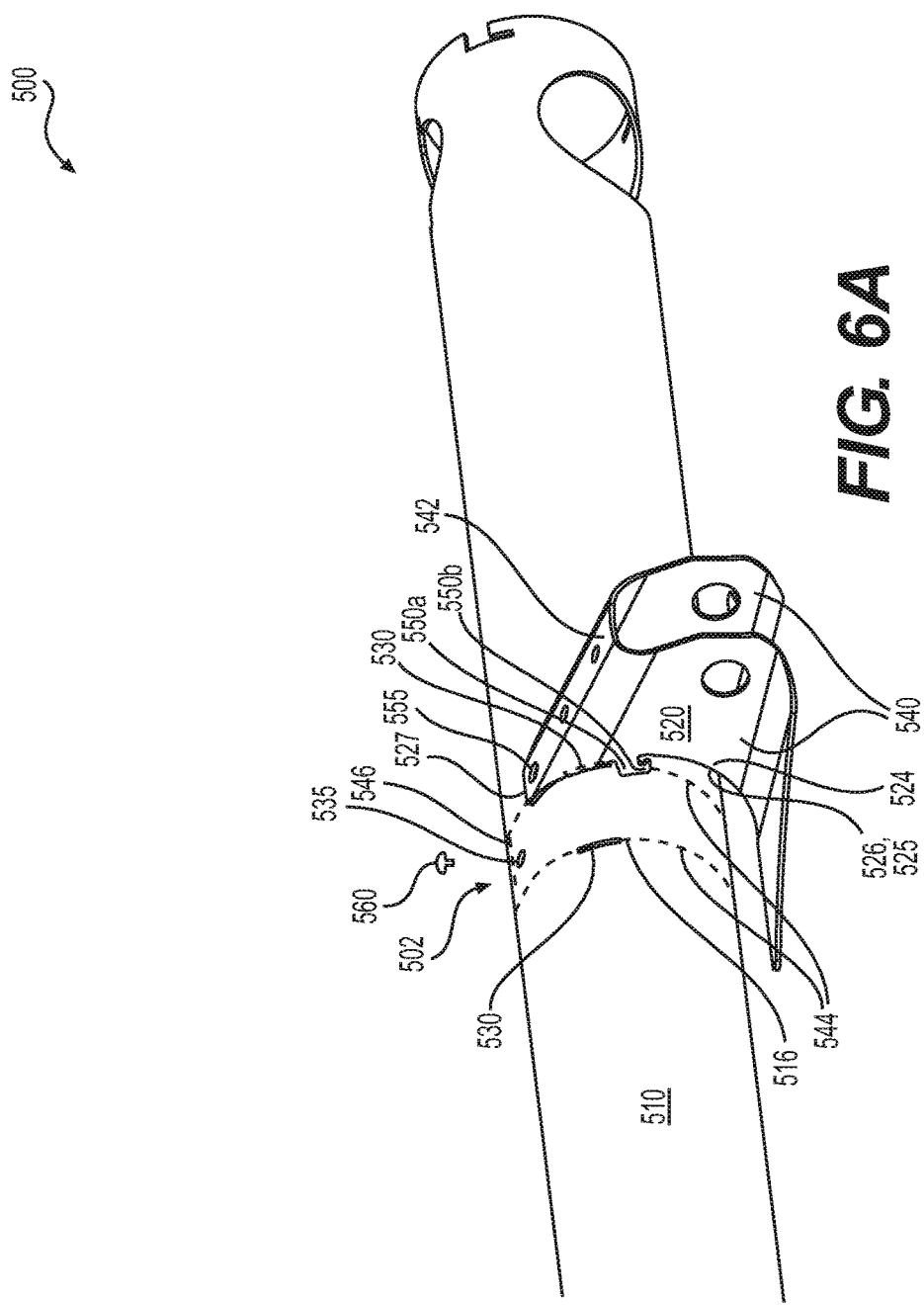

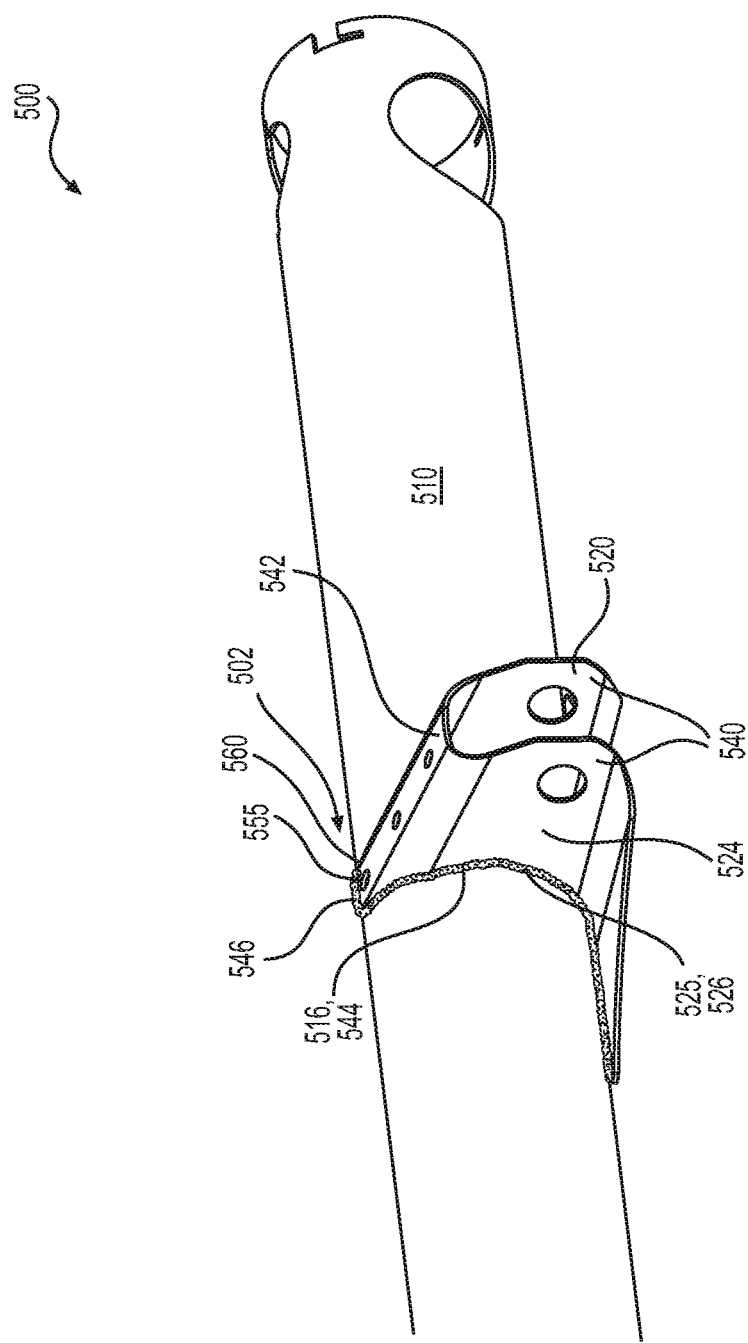

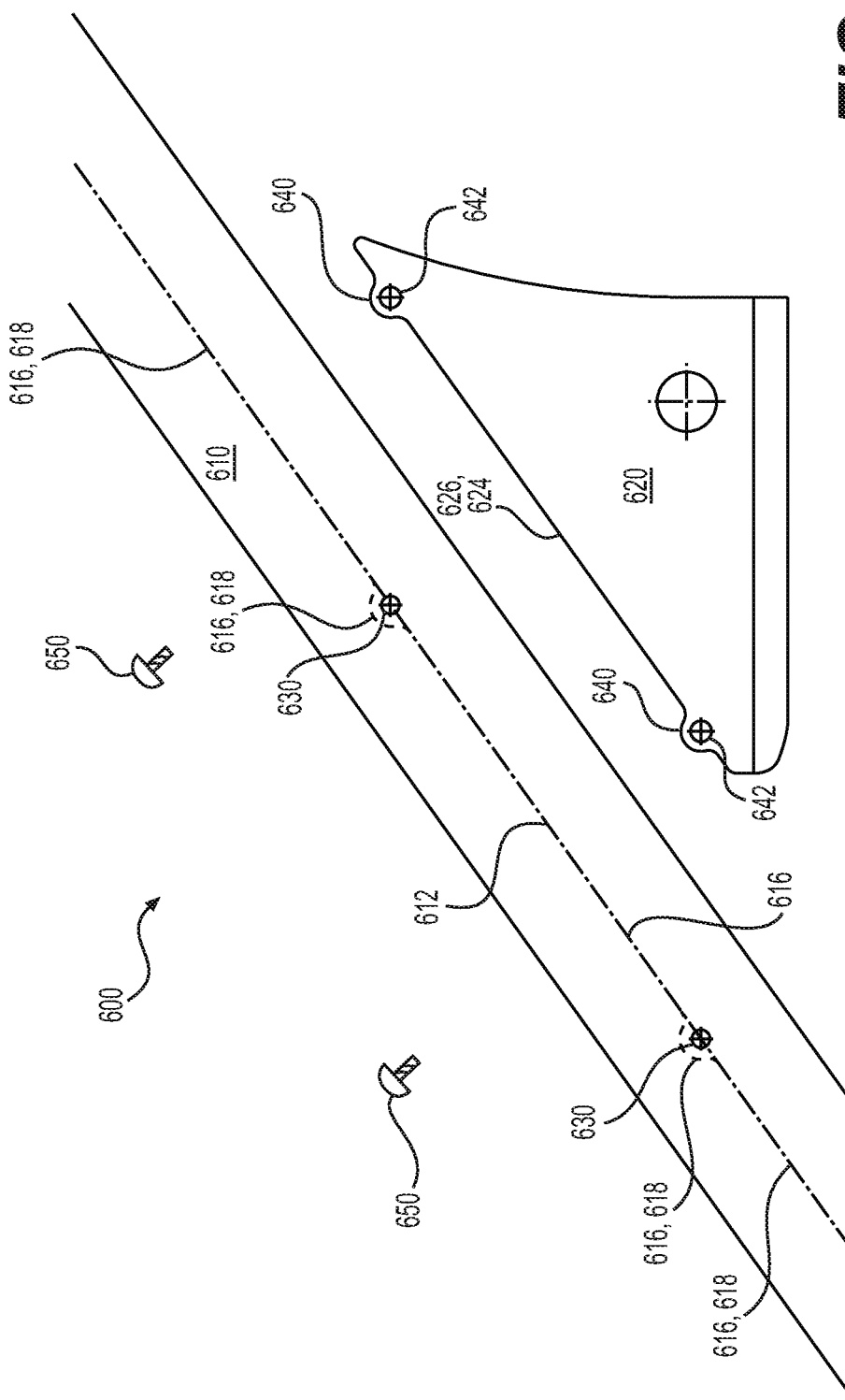

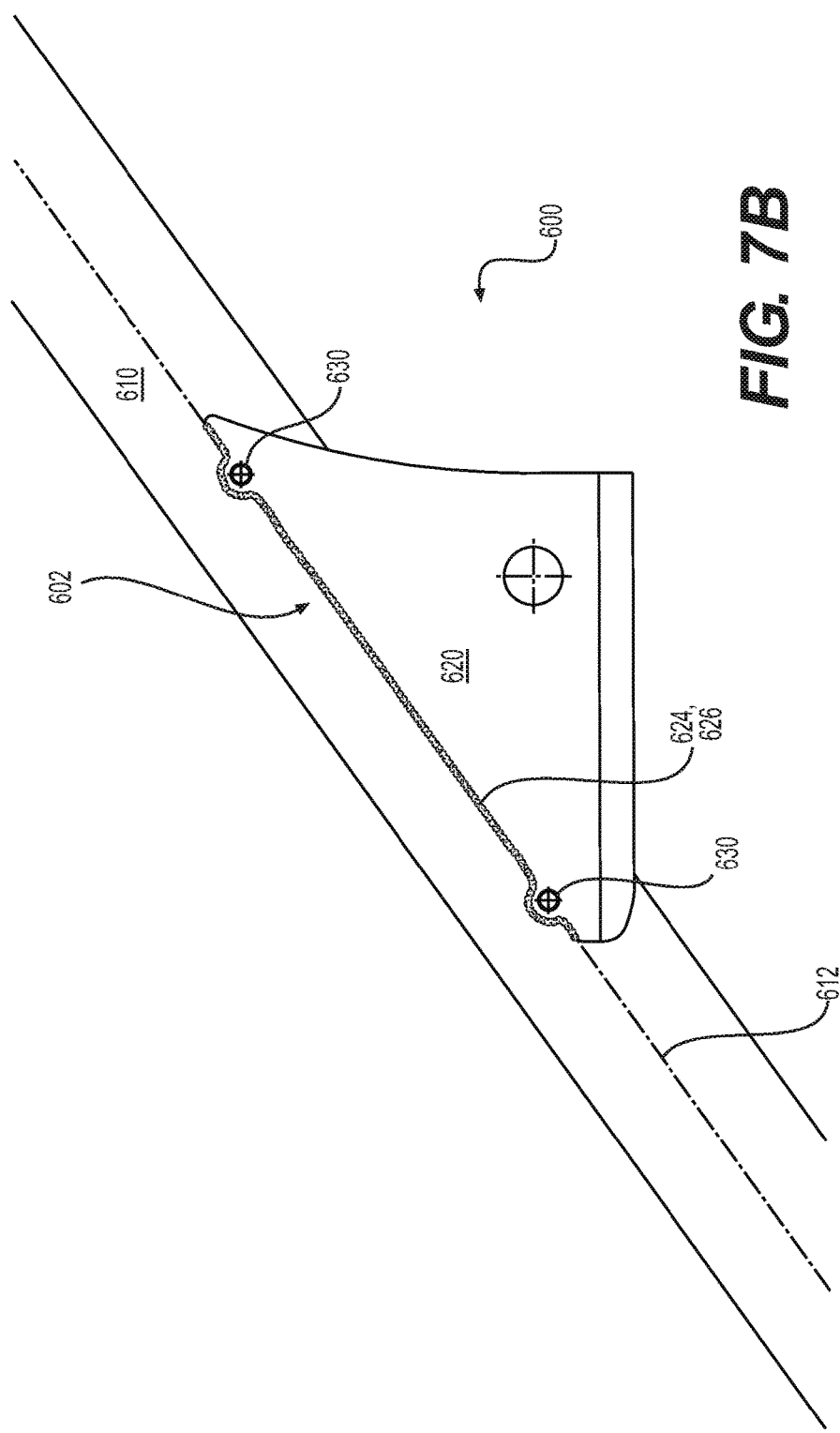

_US 9,815,145 B2_

FRAME ASSEMBLY FOR A VEHICLE

CROSS-REFERENCE

The present application claims priority to U.S. Provisional Patent Application No. 62/073,602 filed on Oct. 31, 2014, and U.S. Provisional Patent Application No. 62/109,375 filed on Jan. 29, 2015 the entirety of both of which is incorporated herein for reference.

FIELD OF THE TECHNOLOGY

The present technology relates to frame assemblies for vehicles, and assembly methods therefor.

BACKGROUND

Vehicle frames are constructed of interconnected frame members of various kinds, including tubular frame members, beams, solid rods, and different kinds of brackets. In order to achieve the desired precision and tolerances in the assembled frame structure, the frame members are generally pre-assembled in jigs designed to hold the frame members in their respective positions while they are connected together, for example, by welding. A significant factor in the ultimate precision achieved in the assembled frame is the precision and tolerance of the various parts of the pre-assembly jig itself. Jigs used for pre-assembly of the frame members, especially for tubular frame members, are often complicated and expensive to manufacture. Pre-assembly of the tubes in the jigs is often also quite labor-intensive and time-consuming.

There is therefore a desire for a frame assembly and a method of assembling a frame assembly for a vehicle that is reliable and convenient to use, effective for achieving desired precision and tolerances, and suitable for use in mass production.

SUMMARY

It is an object of the present technology to ameliorate at least some of the inconveniences present in the prior art.

According to one aspect of the present technology, there is provided a frame assembly for a vehicle including a first frame member defining a first frame member axis. The first frame member also defines a slot and has a first frame member connection portion adjacent the slot. A second frame member defines a second frame member axis. The second frame member has a projection and a second frame member connection portion adjacent the projection. The projection is received in the slot. The first frame member connection portion is connected to the second frame member connection portion to form a connection region. The second frame member axis is disposed at a non-zero angle with respect to the first frame member axis in the connection region.

In some implementations, each of the first and second frame members is tubular.

In some implementations, each of the first and second frame members is cylindrical.

In some implementations, the projection is linear, T-shaped or L-shaped.

In some implementations, the slot is linear, T-shaped or L-shaped.

In some implementations, the projection is disposed at a closed end of the slot.

In some implementations, the slot is a first slot, the projection is a first projection, one of the first and second members has a second slot, and the other of the first and second members has a second projection being received in the second slot and being spaced from the first projection.

In some implementations, the projection includes a plurality of projections spaced apart from one another.

In some implementations, the first frame member connection portion is welded to the second frame member connection portion.

In some implementations, each of the slot and the projection is formed by laser-cutting.

In some implementations, the second frame member connection portion and the projection are disposed at an end of the second frame member.

In some implementations, the second frame member connection portion is an end surface of the second frame member and the projection extends from the end surface in a direction parallel to the second frame member axis.

In some implementations, a portion of the first frame member is disposed between a portion of the projection and the end surface.

In some implementations, the second frame member connection portion circumscribes the slot of the first frame member.

In some implementations, the first frame member defines an opening extending therethrough, the second frame member connection portion circumscribing the opening.

In some implementations, the slot is formed continuously with the opening.

In some implementations, the slot is a first slot, the projection is a first projection. The first frame member has a second slot. The second frame member has a second projection being received in the second slot and disposed spaced from the first projection. The second frame member connection portion circumscribes the opening, the first slot and the second slot.

In some implementations, each of the first and second slots is formed continuously with the opening.

In some implementations, one of the first and second frame members defines an opening extending therethrough. The other of the first and second frame members extends through the opening.

In some implementations, the second frame member defines the opening extending therethrough. The projection of the second frame member extends into the opening. The slot of the first frame member extends from an end of the first frame member. The first frame member extends through the opening such that the projection is received in the slot, and a rim of the opening is connected to the first frame member.

In some implementations, the second frame member is tubular. The opening is a first opening. The second frame member defines a second opening extending therethrough, the first and second openings being disposed on opposite sides with respect to the second frame member axis. The first frame member extends through the first and second openings.

In some implementations, the first and second openings define an opening axis, the opening axis being disposed generally perpendicular to the second frame member axis.

According to another aspect of the present technology, there is provided a method of assembling a frame assembly. The frame assembly includes a first frame member having a first frame member axis and a second frame member having a second frame member axis. The method includes inserting a projection of the second frame member into a slot of the first frame member, and contacting a first frame member connection portion of the first frame member with a second frame member connection portion of the second frame member to form a connection region. The first and second frame members are thereby positioned for connection with the second frame member axis disposed at a non-zero angle with respect to the first frame member axis in the connection region. After positioning the first and second frame members for connection, the first frame member connection portion is connected to the second frame member connection portion.

In some implementations, when the first frame member connection portion is connected to the second frame member connection portion, the second frame member connection portion circumscribes the slot.

In some implementations, when the first frame member connection portion is connected to the second frame member connection portion, the second frame member connection portion circumscribes an opening defined through the first frame member.

In some implementations, the opening is formed continuously with the slot. Inserting the projection into the slot includes placing the projection in the opening, and moving the projection from the opening into the slot.

In some implementations, connecting comprises welding.

In some implementations, inserting the projection into the slot comprises engaging the first frame member with the second frame member.

In some implementations, after inserting the projection into the slot and before connecting the first frame member connection portion with the second frame member connection portion, the projection is moved along the slot.

In some implementations, the projection is moved along the slot until the projection is disposed at an end of the slot.

In some implementations, the slot is a first slot, and the projection is a first projection. One of the first and second frame members includes a second slot and the other of the first and second frame members includes a second projection. The method further includes, inserting the second projection into the second slot after moving the first projection along the first slot and before connecting the first frame member connection portion with the second frame member connection portion.

In some implementations, the slot is a first slot and the projection is a first projection. One of the first and second frame members includes a second slot and an other of the first and second frame members includes a second projection. The method further includes, after inserting the first projection into the first slot and before connecting the first frame member connection portion with the second frame member connection portion, moving the second frame member with respect to the first frame member to align the second projection with the second slot. After aligning the second projection with the second slot, the second projection is inserted through the second slot.

In some implementations, inserting the projection of the second frame member into the slot of the first frame member includes moving the second frame member with respect to the first frame member in an insertion direction parallel to the first frame member axis or the second frame member axis.

Also, terms related to spatial orientation such as forward, rearward, front, rear, upper, lower, left, and right, are as they would normally be understood by a driver of the vehicle sitting thereon in a normal driving position with the vehicle being upright and steered in a straight ahead direction.

Definitions of terms provided herein take precedence over definitions in the document incorporated herein by reference.

Implementations of the present technology have at least one of the above-mentioned object and/or aspects, but do not necessarily have all of them.

Additional and/or alternative features, aspects, and advantages of implementations of the present technology will become apparent from the following description, the accompanying drawings, and the appended claims.

BRIEF DESCRIPTION OF THE DRAWINGS

Further features and advantages of the present technology will become apparent from the following detailed description, taken in combination with the appended drawings, in which:

FIG. 1 is a perspective view, taken from a front, right side of a front portion of a frame assembly of a side-by-side vehicle;

FIG. 2G is a cross-sectional view, of the portion of the frame assembly of FIG. 2A, taken along a line corresponding to the line 2F-2F shown in FIG. 2B;

FIG. 3A is a perspective view, taken from a top and front, of a portion of the frame assembly of FIG. 1 showing another implementation of one of the frame members;

FIG. 3B is a top plan view of a portion of another implementation of a frame member;

FIG. 3C is a top plan view of a portion of another implementation of a frame member;

FIG. 5A is a perspective view, taken from a top and front, of another implementation of the frame assembly of FIG. 4A showing, in isolation a first frame member thereof and a second frame member thereof in a disassembled configuration;

FIG. 5B is a perspective view, taken from a top and front, showing the frame members of FIG. 5A in an assembled configuration;

FIG. 5C is a perspective view, taken from a top and front, of the first frame member of FIG. 5A and another implementation of the second frame member of FIG. 5A in a disassembled configuration;

FIG. 5D is a perspective view, taken from a top and front, showing the frame members of FIG. 5C in an assembled configuration;

FIG. 6A is a perspective view, taken from a front and left side, of a frame assembly portion according to another implementation, showing a first frame member thereof and a second frame member thereof before assembly;

FIG. 6B is a perspective view, taken from a front and left side, of the frame assembly portion of FIG. 6A showing the first and second frame members in an assembled configuration;

FIG. 7A is a top plan view of a frame assembly portion according to another implementation, showing a first frame member thereof and a second frame member thereof before assembly;

FIG. 7B is a top plan view of the frame assembly portion of FIG. 7A showing the first and second frame members in an assembled configuration.

DETAILED DESCRIPTION

Figure 2A:
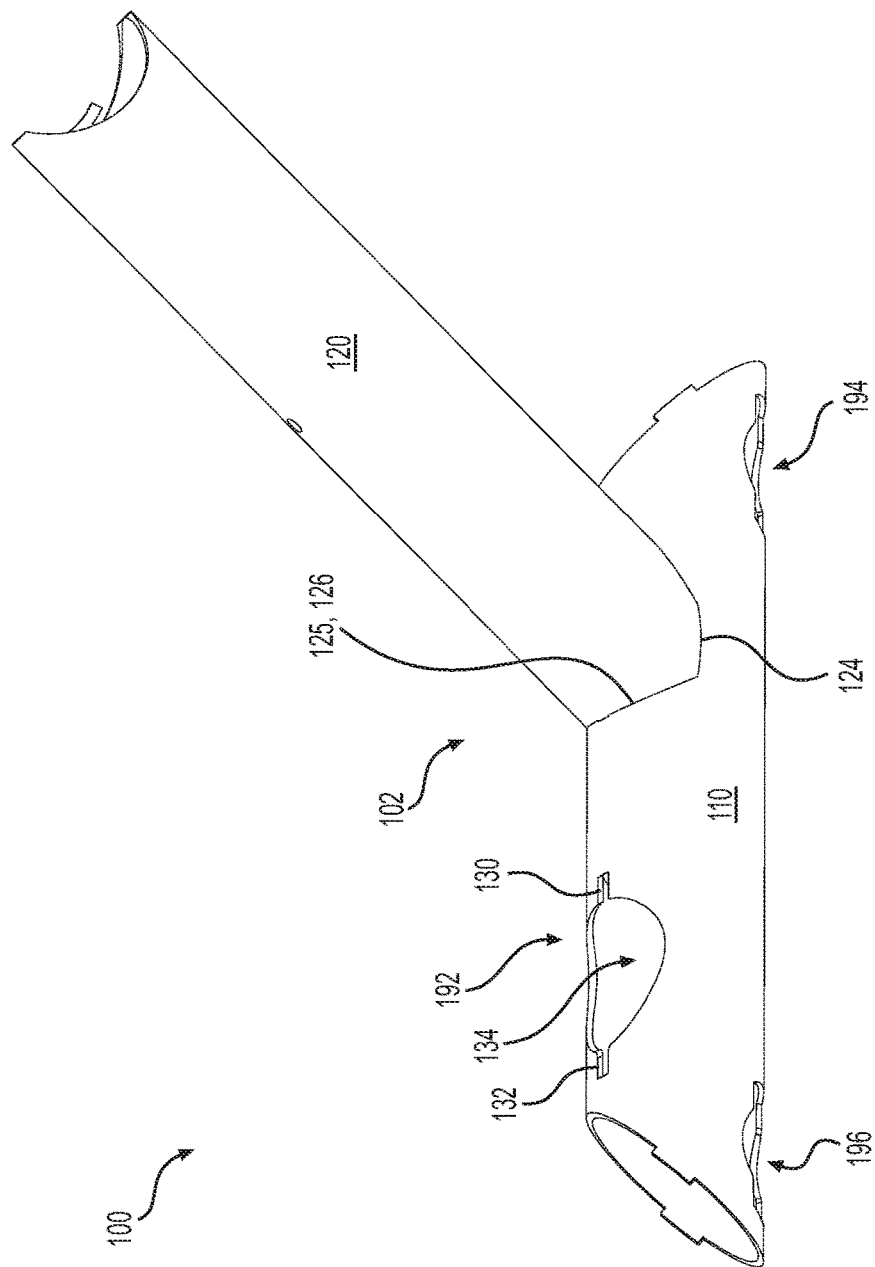
FIG. 2A is a perspective view, taken from a top and front, of a portion of the frame assembly of FIG. 1 showing, in isolation, two frame members in an assembled configuration.

The present technology will be described below with respect to a frame assembly for a side-by-side vehicle (SSV) designed to accommodate two riders (driver and passenger) seated side-by-side in an open cockpit area. However, it is contemplated that some aspects of the technology could be adapted for frame assemblies of other kinds of vehicles, such as a single passenger off-road vehicle, two-, four- or more passenger SSVs, golf carts, pickup trucks, automobiles, and the like.

FIG. 1 illustrates a front portion of a frame assembly 12 of an SSV (not shown). The SSV will not be described herein. The front frame assembly portion 12 is configured to support and have attached thereto, components of the SSV including but not limited to, a roll cage extending above a cockpit area of the SSV, a dashboard extending along the front of the cockpit area, a radiator, a left and a right front suspension assembly, and a steering assembly. Further details of the SSV, and the frame assembly 12 of the SSV, can be found in U.S. Provisional Patent Application No. 62/109,375, filed on Jan. 29, 2015 the entirety of which is incorporated herein by reference.

The frame assembly 12 includes several interconnected frame members including tubular frame members and various kinds of brackets. The description is provided herein with respect to frame assembly portions 100, 100', 100", 100''', 200, 300, 400, 500 and 600, referred to hereinafter as frame assemblies 100, 100', 100", 100''', 200, 300, 400, 500 and 600, for convenience.

The frame assembly 100 and a method of assembling the frame assembly 100 will now be described with reference to FIGS. 2A to 2G. The frame assembly 100 includes a frame member 110 connected to another frame member 120. A frame member connection portion 126 (FIGS. 2A and 2C) of the frame member 120 is connected to a frame member connection portion 116 (FIG. 2B) of the frame member 110, thereby defining the connection region 102 of the frame assembly 100.

With reference to FIGS. 2A to 2G, the frame member 110 is tubular and cylindrical. The frame member 110 has a central axis 112, or a frame member axis 112. The frame member 110 has a rear right arrangement 190 of a first slot 130, a second slot 132 and an opening 134. The rear right arrangement 190 is disposed on a rear right side portion of the frame member 110 when viewed from the top as in FIG. 2A. The rear right arrangement 190 is used for the connection of the frame member 120 to the frame member 120. Each of the slots 130, 132 is formed continuously with the opening 134. It is contemplated however that one or both of the slots 130, 132 could be spaced apart from the opening 134. The first slot 130 and the second slot 132 are both linear and extend parallel to the frame member axis 112. The opening 134 is generally circular as can be seen best in FIG. 5A. It is contemplated that the opening 134 could have a shape other than circular. The shape of the slots 130, 132 could also be different than as shown herein. In the illustrated implementation of the frame assembly 100, the first and second slots 130, 132 generally have the same dimensions and are located on diametrically opposite sides of the opening 134. The slots 130, 132 are spaced apart from each other in a direction parallel to the frame member axis 112. It is contemplated that the slots 130, 132 could be spaced from each other in a direction disposed at an angle to the frame member axis 112. It is also contemplated that the slots 130, 132 could be disposed at locations that are not mutually diametrically opposite to one another with respect to the opening 134. The slot 130 could have a different shape and size compared to the slot 132 as in the implementations of FIGS. 3A and 3B. The slots 130, 132 are complementary respectively to projection 140, 142 of the frame member 120 as will be described below. The opening 134 is formed in order to reduce the overall weight of the frame member 110, and thereby the overall frame 12. It is also contemplated that the opening 134 could be omitted as in the implementations of FIGS. 3A to 3C. It is also contemplated that one of the slots 130, 132 could be omitted.

With reference to FIG. 2A, the frame member 110 has a rear left arrangement 192 of two slots and one opening defined in a rear left portion of the frame member 110 for connection of a frame member 170 (FIG. 1) which is a mirror image of the frame member 120. The rear left arrangement 192 is therefore formed as a mirror image of the rear right arrangement 190. Each of the slots 130, 132 and the opening 134 of the rear right arrangement 190 has a corresponding element in the rear left arrangement 192. The corresponding elements of the rear left arrangement 192 and the rear right arrangement 190 have therefore been labeled with the same reference numbers. The frame member 110 also has a front right arrangement 194 of slots and openings (not indicated) defined in the front right portion of the frame member 110 for connection of a frame member 180 (FIG. 1). The frame member 110 similarly has a front left arrangement 196 of slots and openings (not indicated) defined in the front left portion of the frame member 110 for connection of a fifth frame member 180 (FIG. 1). The front arrangements 194, 196 and the frame members 170, 180, 182, and their connection to the frame member 110 will not be described herein in any further detail. Unless explicitly stated otherwise, all further references to the slots 130, 132 and opening 134 refer to the rear right arrangement 190.

With reference to FIGS. 2A to 2G, the frame member 120 is tubular and cylindrical. The frame member 120 has a central axis 122, or a frame member axis 122. One end 124 of the frame member 120 is disposed on the curved outer surface of the frame member 110 and welded thereto as will be described below. The end 124 is therefore configured to have a curved end surface 125 (FIG. 2B) that is congruous with the curved outer surface of the frame member 110. The end surface 125 would be planar for connection to a planar surface of the frame member.

Figure 2B:
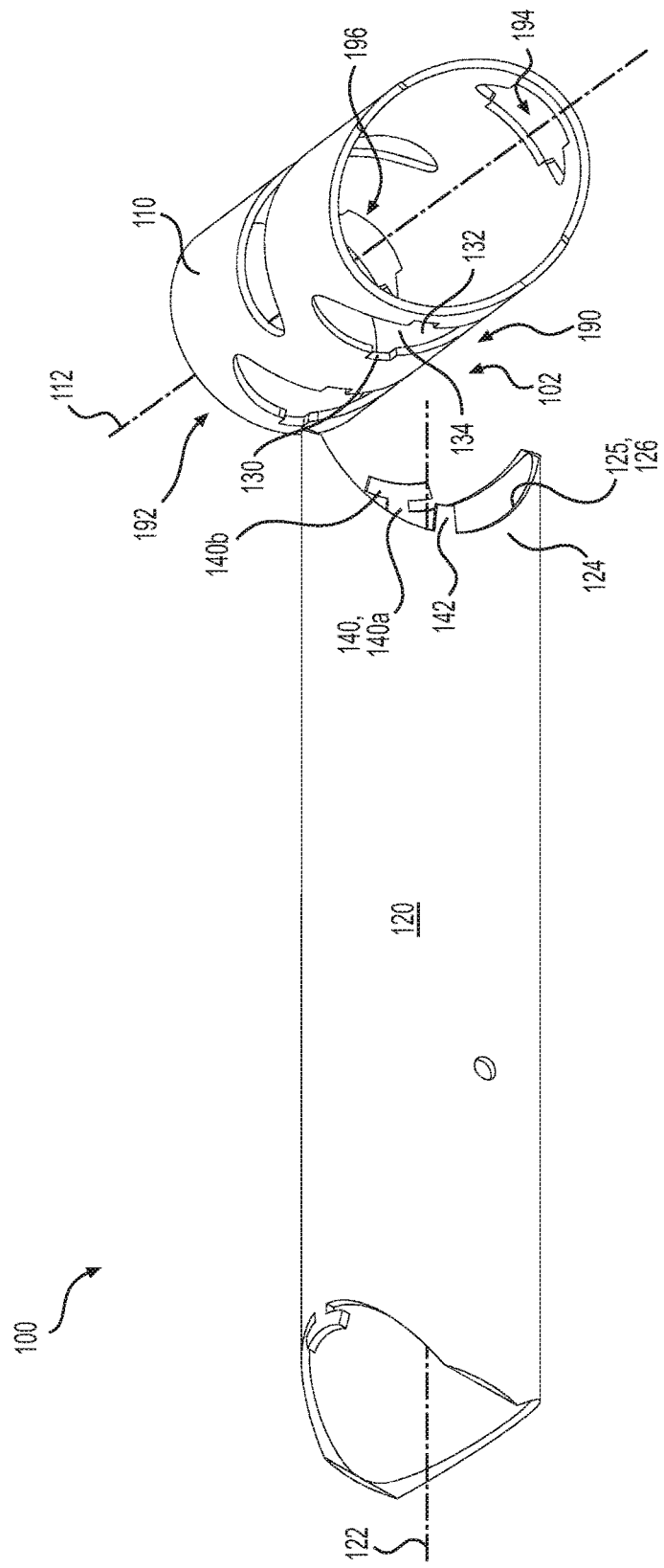
FIG. 2B is a perspective view, taken from a left side, of the portion of the frame assembly of FIG. 2A with the two frame members shown in a disassembled configuration.
Figure 2C:
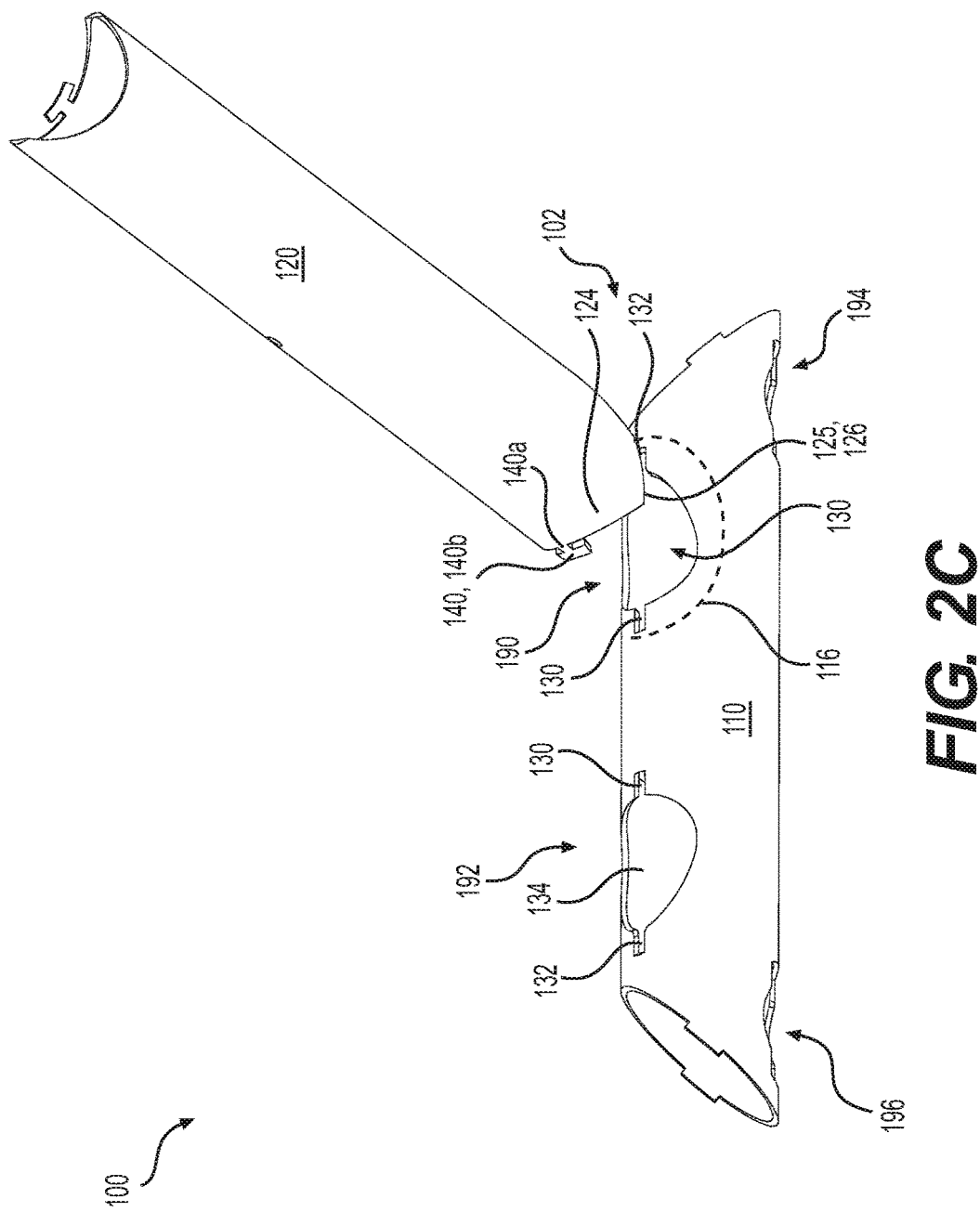
FIG. 2C is another perspective view, taken from a top and front, of the frame assembly of FIG. 2B.
Figure 2D:
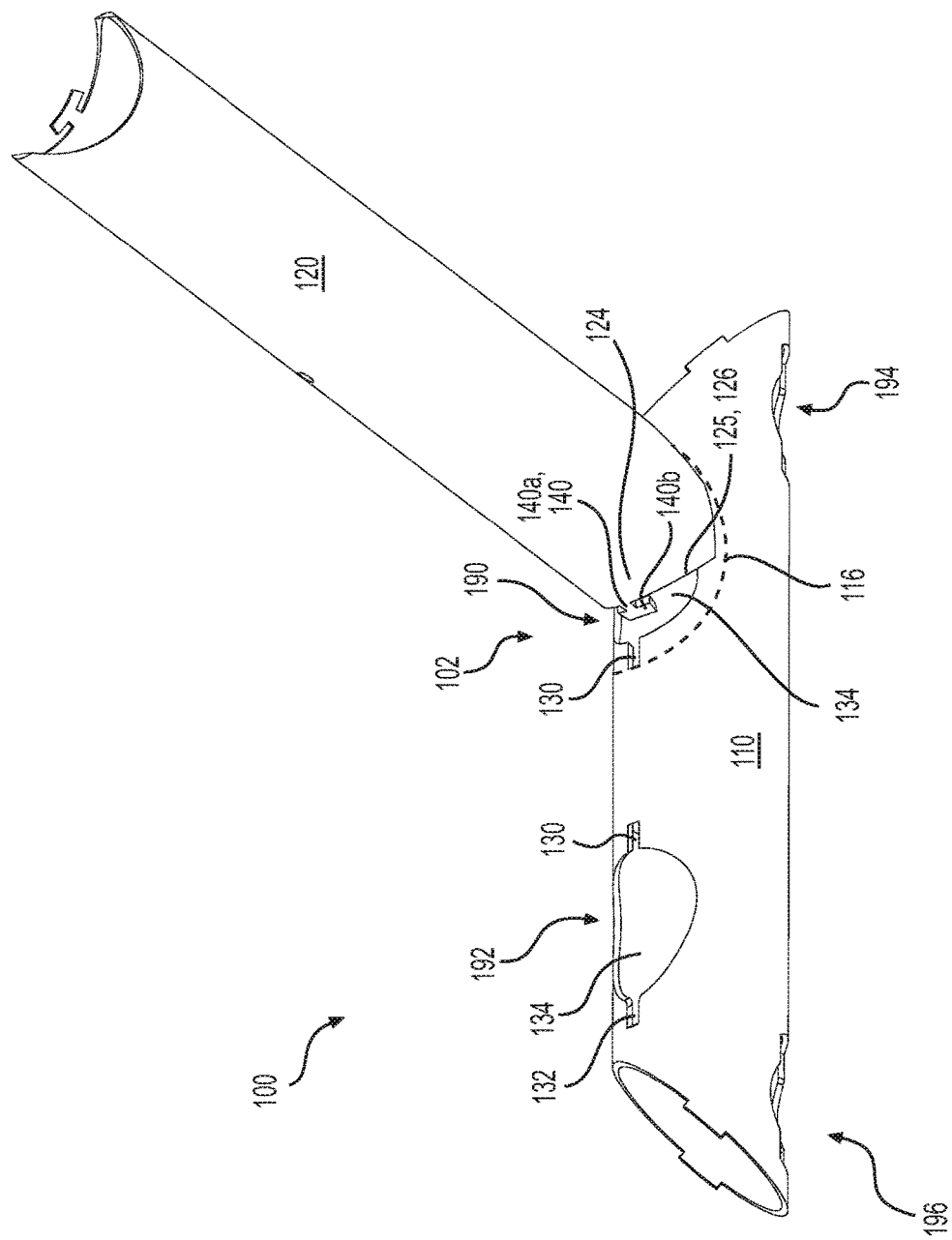
FIG. 2D is a perspective view, taken from a top and front, of the portion of the frame assembly of FIG. 2B, with the two frame members being disposed as in one step of assembly.
Figure 2E:
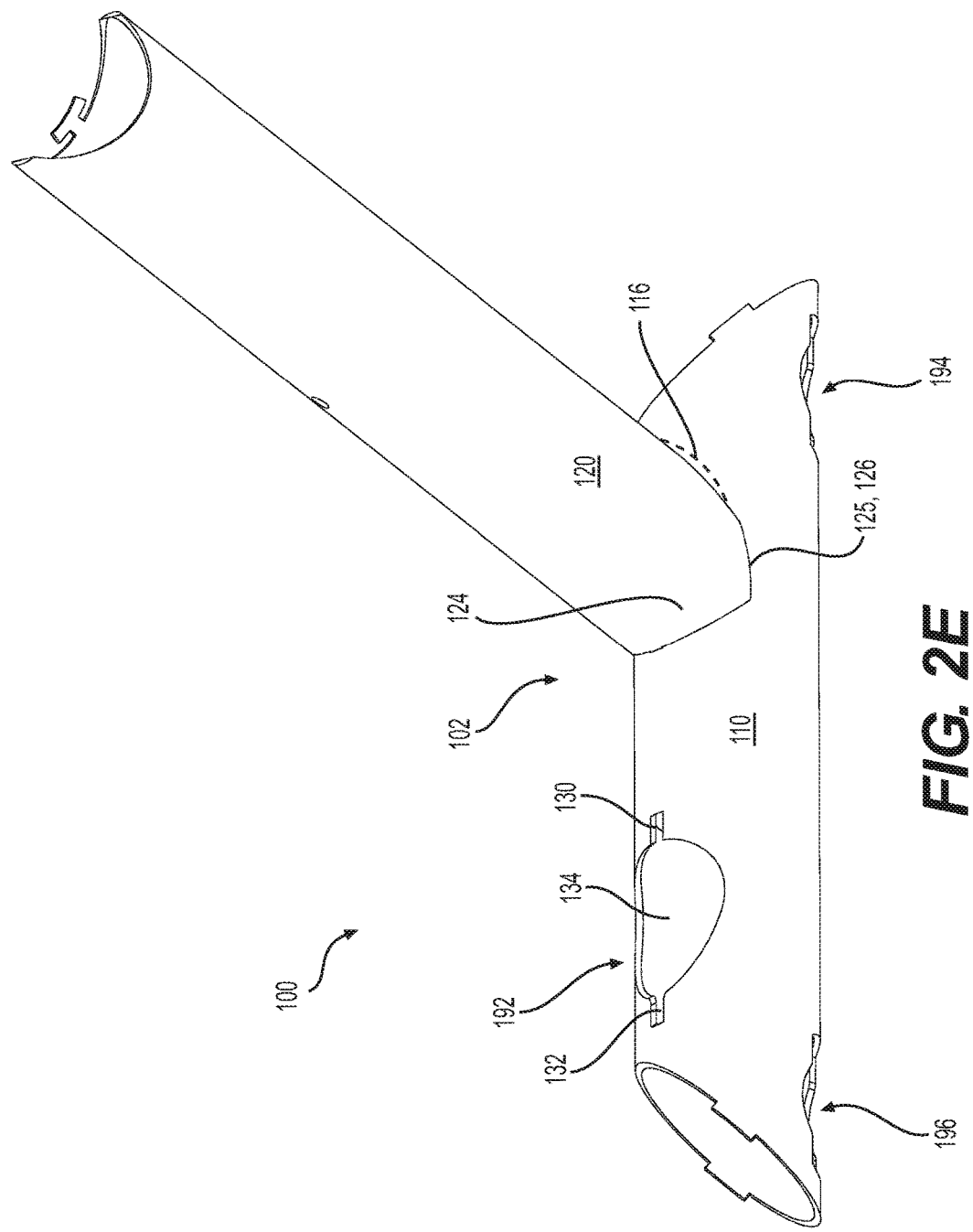
FIG. 2E is a perspective view, taken from a top and front, of the portion of the frame assembly of FIG. 2B, with the first and second frame members being disposed as in another step of assembly after the step shown in FIG. 2D.

As can be seen in FIGS. 2A, 2E and 2G, the end surface 125 of the frame member 120 is connected to the outer surface of the frame member 110 so as to circumscribe the opening 134, and slots 130, 132. In the illustrated implementation therefore, the frame member connection portion 126 is the curved end surface 125 of the frame member 120. The frame member connection portion 116 is the portion 116 (FIG. 2C) of the curved outer surface of the frame member 110 surrounding the slots 130, 132 and opening 134 onto which the curved end surface 125 is received. It is contemplated that the frame member connection portion 126 could be a portion of the end surface 125 and that the frame member connection portion 126 would not circumscribe the slots 130, 132 and the opening 134 but would only partially surround the slots 130, 132 and the opening 134.

In the illustrated implementation, each frame member axis 112, 122 extends in a single continuous straight line throughout the entire length of the respective frame member 110, 120. It is however contemplated that a portion of one or both of the frame members 110, 120 could be curved or bent such that the respective frame member axis 112, 122 is curved or bent along a section thereof.

In the illustrated implementation, the frame member axis 122 is disposed at a non-zero and non-perpendicular angle with respect to the frame member axis 112. Generally, the frame member axis 122 is disposed at a non-zero angle with respect to the frame member axis 112 at least in the connection region 102 formed by the first and frame member connection portions 116, 126.

The curved end surface 125 of the frame member 120 has a first projection 140 and a second projection 142. The projections 140 and 142 are located on diametrically opposite sides with respect to the frame member axis 122. The first projection 140 is received in the first slot 130 of the frame member 110. The second projection 142 is received in the second slot 132 of the frame member 110 as will be described below.

Figure 2F:
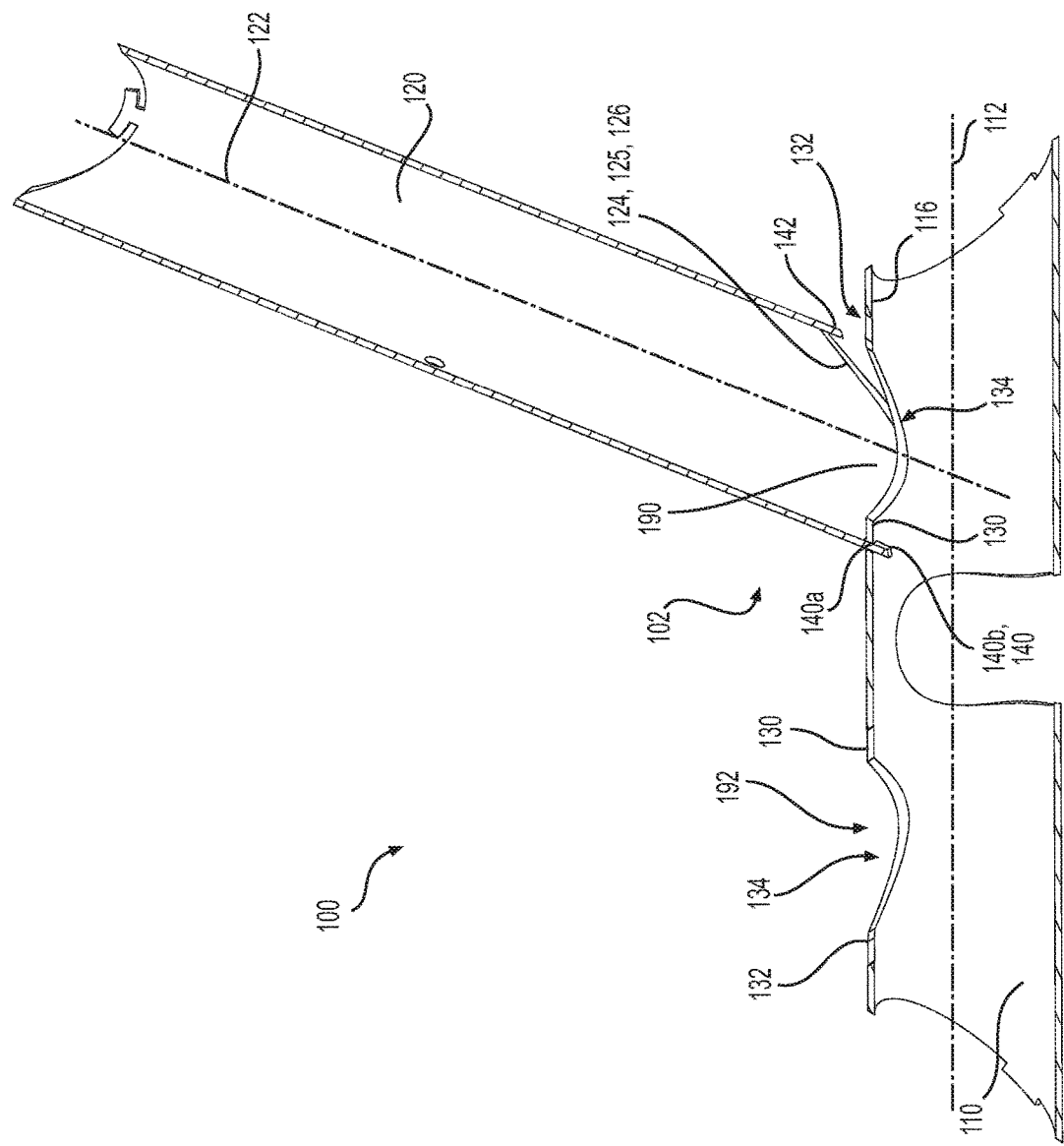
FIG. 2F is a cross-sectional view, of the portion of the frame assembly of FIG. 2E, taken along a line corresponding to the line 2F-2F shown in FIG. 2B.

With reference to FIGS. 2B to 2D, the first projection 140 is T-shaped. An axial portion 140a of the first projection 140 extends outwardly from the curved end surface 125 in a direction parallel to the frame member axis 122. A circumferential portion 140b of the T-shaped projection 140 is connected to the end of the axial portion 140a spaced from the end surface 125. The circumferential portion 140b extends outwardly from each side of the first axial portion 140a in a circumferential direction of the frame member 120. With reference to FIGS. 2F and 2G, in an assembled configuration of the frame assembly 100, the axial portion 140a extends through the slot 130 at an end of the first slot 130 farthest away from the opening 134. The curved end surface 125 and the circumferential portion 140b of the projection 140 are disposed on opposite sides of the slot 130 so that the cylindrical wall of the frame member 110 adjacent to the end of the slot 130 is held between the curved end surface 125 and the first projection circumferential portion 140b. The curvature of the portion 140b matches the curvature of the wall of the frame member 110 adjacent the slot 130. It is contemplated that the first projection 140 could have a different shape than as shown herein. For example, the projection 140 could be linear with the circumferential portion 140b being omitted. The first projection could also be triangular, or L-shaped instead of T-shaped. As another example, the portion 140b could be in the form of a disc.

With reference to FIG. 2B, the second projection 142 is linear and extends outwardly from the curved end surface 125 in a direction parallel to the frame member axis 122. With reference to FIG. 2G, in an assembled configuration of the frame assembly 100, the second projection 142 is positioned at an end of the second slot 132 farthest away from the opening 134.

It is contemplated that one or both of the frame members 110, 120 could not be cylindrical, and could have a cross-section (in a plane normal to the respective axis 112, 122) that is other than circular. For example, one or both of the frame members 110, 120 could have a rectangular cross-section. It is also contemplated that one or both of the frame members 110, 120 could not be tubular. For example, one or both of the frame members 110, 120 could be in the form of a beam having a C-shaped cross-section, an I-shaped cross-section or the like.

The method of assembling the frame assembly 100 will now be described with reference to FIGS. 2A to 2G.

As can be seen in FIGS. 2C to 2D, the frame member 120 is moved with respect to the frame member 110 to insert the first projection 140 of the frame member 120 into the opening 134 of the frame member 110. As can be seen in FIGS. 2E to 2F, the frame member 120 is then moved with respect to the frame member 110 to move the axial portion 140a of the first projection 140 into the first slot 130. In the illustrated implementation therefore, the frame member 120 is moved in the direction parallel to the frame member axis 112 to insert the first projection 140 into the first slot 130. The first projection 140 is moved along the slot 130 (i.e. in a direction away from the opening 134) until the axial portion 140a abuts the wall of the frame member 110 adjacent the closed end of the first slot 130 farthest from the opening 134 as can be seen in FIG. 2F. With the first projection 140 disposed in the closed end of the slot 130, the frame member 120 is lowered towards the frame member 110 so as to insert the second projection 142 into the second slot 132 as can be seen in FIG. 2G. The frame member 120 may also need to be rotated with respect to the frame member 110 in order to align the second projection 142 with the second slot 132. In the illustrated implementation, the slots 130, 132 are configured such that, when the first projection 140 is positioned at the end of the first slot 130, the second projection 142 is aligned with the end of the second slot 132 farthest away from the opening 134. In this implementation, the second projection 142 cannot be inserted into the second slot 132 until the first projection 140 is positioned at the end of the first slot 130.

When the projections 140, 142 are received in the respective ends of corresponding slots 130, 132, the frame member connection portion 126 is disposed on the frame member connection portion 116 so as to circumscribe the slots 130, 132 and the opening 134. In this position, the first and frame members 110, 120 are locked to each other. The first and frame members 110, 120 cannot be rotated with respect to each other when the projections 140, 142 are received in the corresponding slots 130, 132. Since the projections 140, 142 are received in the respective ends of corresponding slots 130, 132, the frame member 120 is also prevented from moving with respect to the frame member 110 in a direction parallel to the longitudinal direction of the slots 130, 132 (and the frame member axis 112 in the illustrated implementation). The width of the first projection axial portion 140a disposed in the first slot 130 and the second projection 142 disposed in the second slot 132 further limits movement of the frame member 120 with respect to the frame member 110 in the lateral direction of the slot 130 (circumferential direction of the frame member in the illustrated implementation). When the projections 140, 142 are received in the respective ends of corresponding slots 130, 132, the wall of the frame member 110 is held between the end surface 125 and the circumferential portion 140b of the first projection 140 such that the frame member 120 cannot be completely pulled away from the frame member 110 in the direction parallel to the frame member axis 122. The frame member 110 is thus engaged with the frame member 120.

If the first projection 140 is linear similar to the second projection 142 however, the frame member 110 is not engaged with the frame member 120 when both projections 140, 142 are received in the corresponding slots 130, 132. The frame member 120 is then not prevented from being pulled away from the frame member 110 in a direction parallel to the frame member axis 122. In this case where the projections 140, 142 are both linear, the projections 140, 142 could be inserted into the corresponding slots 130, 132 simultaneously, or the second projection 142 could be inserted onto the second slot 132 before inserting the first projection 140 into the first slot 130.

When the projections 140, 142 are received in the corresponding slots 130, 132, the frame members 110, 120 are held in position for connection to each other with their respective axes 112, 122 disposed at an angle to each other in the connection region 102. The frame member connection portion 116 is then welded to the frame member connections portion 126 with the frame members 110, 120 being held in position for connection to each other. It is contemplated that the frame members 110, 120 could be fixed to each other using fasteners, adhesives or the like, instead of being welded together. The frame assembly 100 described above does not need the use of a jig for positioning and holding the frame members 110, 120 in their respective positions before they are connected to each other.

In the illustrated implementation, the weld (connection portion 116) circumscribes the slots 130, 132 and the opening 134 such that stress risers that may be caused by the slots 130, 132 and opening 134 are disposed inside the weld in a relatively lower stress area. In addition, the weld is formed so as to circumscribe the slots 130, 132 and the opening 134, the weld formed is continuous without any gaps which contributes to the rigidity and strength of the frame assembly 100. It is contemplated that the opening 134 could be omitted as in the implementations of FIGS. 3A to 3C described below.

FIG. 3A shows an alternate implementation 100' of the frame assembly 100. Corresponding and similar elements of the implementations 100, and 100', have been labeled herein with the same reference labels and will not be discussed again herein in detail.

With reference to FIG. 3A, the frame member 120 of the frame assembly 100' is identical to the frame member 120 of the frame assembly 100. The frame member 110 of the frame assemblies 100' is similar to the frame member 110 of the frame assembly 100 except for the rear left arrangement 192' and rear right arrangement 190'. As in the frame assembly 100, the rear left arrangement 192' is a mirror image of the rear right arrangement 190' in the frame assemblies 100'. However, the rear left arrangement 192' of each of the frame assemblies 100' is different from the rear left arrangement 192 of the frame assembly 100 as will be described below. The following discussion of FIG. 3A is being provided with reference to the rear left arrangement 192' since the rear right arrangement 190', being circumscribed by the frame member 120 connected to the frame member 110, cannot be seen in this figure.

With reference to FIG. 3A, the opening 134 of the frame assembly 100 has been omitted from the arrangement 192' in the frame assembly 100'. The first and second slots 130', 132 are therefore formed as two separate spaced apart slots 130' and 132. The first slot 130' is T-shaped instead of linear. The T-shaped slot 130' has a first arm 130a and a second arm 130b extending perpendicular thereto. In the frame assembly 100', the first projection circumferential portion 140b of the frame member 120 is inserted through the arm 130b of the T-shaped slot 130' so that the first projection axial portion 140a is disposed in the slot portion 130b. The first projection axial portion 140a is then moved from the arm 130a of the first slot 130' and into the other arm 130a of the first slot 130', thereby disposing the cylindrical wall of the frame member 110 between the first projection circumferential portion 140b and the end surface 125 of the frame member 120. The first slot 130' is configured such that the second projection 142 is aligned with the second slot 132 when the projection portion 140a is disposed at the end of the slot portion 130a farthest from the slot portion 130b. It is also contemplated that the slot 130' could be L-shaped instead of T-shaped as in the implementation of FIG. 3B described below.

FIG. 3B illustrates another implementation 110" of the frame member 110. Corresponding and similar elements of the frame members 110 and 110" have been labeled herein with the same reference labels and will not be discussed again herein in detail.

With reference to FIG. 3B, the frame member 110" is not a cylindrical tubular member but a tubular member having a rectangular cross-section. The frame member 110" has an arrangement 190" similar to the rear right arrangement 190 of the frame member 110 (FIG. 2B). The opening 134 of the frame assembly 100 has been omitted from the arrangement 190" in the frame member 110". The first and second slots 130, 132 are therefore formed as two separate spaced apart linear slots 130 and 132. The arrangement 190" of slots 130, 132 is defined in a planar wall of the rectangular tubular member 110".

With reference to FIG. 3B, the arrangement 190" of the frame member 110" is configured for connection of a cylindrical tubular frame member (not shown) similar to the frame member 120 of the frame assembly 100. The tubular cylindrical frame member (not shown) connected to the frame member 110" is similar to the frame member 120 (FIG. 2B) except that instead of having the curved end surface 125, the frame member (not shown) connected to the frame member 110" has a planar end surface that is congruous with the planar outer surface of the planar wall of the tubular member 110". The frame member 110" thus has a connection portion 116" that is elliptical in shape. It is contemplated that the frame member 110" could be any other type of frame member having at least one planar outer surface. It is contemplated that the frame member connected to the frame member 110" could be any type of frame member, including a tubular frame member having a non-circular cross-section, a C-shaped beam, a solid rod and the like.

With reference to FIG. 3B, the frame member 120 is positioned for connection with the frame member 110", by inserting the T-shaped projection 140 into the first slot 130" with the circumferential projection portion 140b aligned with the longitudinal direction of the linear first slot 130. The projection 140 is inserted into the slot 130 such that the circumferential portion 140b is inserted past the slot 130 and the axial portion 140a is disposed in the slot 130. The second projection 142 is then aligned with the second slot 132 by rotating the frame member 120 with respect to the frame member 110", and translating the frame member 120 in the longitudinal direction of the first slot 130 to move the first projection 140 to the closed end of the first slot 130. When the frame member 120 is rotated, the second portion 140*b* is disposed at an angle with respect to the longitudinal direction of the first slot 130, thereby engaging the frame member 110" (i.e. the wall of the frame member 110" is held between the first projection circumferential portion 140*b* and the end surface 125 of the frame member 120).

FIG. 3C illustrates yet another frame member 110'" similar to the frame member 110" of FIG. 3B. Corresponding and similar elements of the frame members 100, 110" and 100'" have been labeled herein with the same reference labels and will not be discussed again herein in detail.

With reference to FIG. 3C, the frame member 110'" is a tubular member having a rectangular cross-section. The frame member 110'" has an arrangement 190'" similar to the arrangement 190" of the frame member 110" (FIG. 3B). The arrangement 190'" has a single linear slot 198 with opposite end portions 130'", 132'" instead of the spaced apart slots 130 and 132 of the arrangements 190 and 190". One or both of the end portions 130'", 132'" could be marked so as to be able to distinguish therebetween.

With reference to FIG. 3C, the frame member 120'" is positioned for connection with the frame member 110'" in a similar manner as described above with respect to the frame assembly 100" of FIG. 3B. The T-shaped projection 140 is first inserted through the slot 198 with the circumferential portion 140*b* being aligned with the longitudinal direction of the slot 198. The circumferential portion 140*b* is inserted past the slot 198 and the axial portion 140*a* is disposed in the slot 198. The frame member 120 is then rotated with respect to the frame member 110'" and translated along the longitudinal direction of the slot 198 such that the projection 140 is disposed in the end portion 130'" and the second projection 142 is aligned with the end portion 132'". The second projection 142 is then inserted into the aligned slot portion 132'" before welding the frame member 110'" to the frame member 120".

With reference to FIG. 3C, the arrangement 190'" of the frame member 110'" is configured for connection of a rectangular tubular frame member (not shown) having a planar end surface congruous with the planar outer surface of the planar wall of the tubular member 110'" and projections 140, 142 extending therefrom. The frame member 110'" thus has a connection portion 116" that is rectangular in shape. It is contemplated that the frame member 110'" could be any other type of frame member having at least one planar outer surface. It is contemplated that the frame member connected to the frame member 110'" could be any type of frame member, including a tubular frame member having a circular or a non-circular cross-section, a C-shaped beam, a solid rod and the like.

Although in the illustrated implementations of FIGS. 2A to 3C, both of the slots 130 and 132, 130' and 132', 130" and 132", 130'" and 132'", are formed in the frame member 110, 110', 110", 110'", and both of the projections 140, 142 are formed in the frame member 120, 120'", it is contemplated that each of the slots 130 and 132, 130' and 132', 130" and 132", 130'" and 132'" could be formed in any one of the members 110 and 120, 110' and 120, 110" and 120", and the corresponding projection 140, 142 would be formed in the other one of the members 110 and 120, 110' and 120, 110" and 120'". It is contemplated that there could be more than two projections, and that each of the projections could be received in a corresponding slot, or a corresponding portion of a single slot.

The slots 130, 132, the projections 140, 142 and the opening 134 described above are created by laser-cutting the corresponding shapes into a tubular cylindrical frame member. Laser cutting allows for greater precision on dimensions than that would be achieved by stamping the corresponding structures into the tubular frame members. The opening 134 can be created before or after the creation of the slots 130, 132 and projections 140, 142. It is however contemplated that any one of slots 130, 132, the projections 140, 142, and the opening 134 could be created by other suitable methods.

Figure 4A:
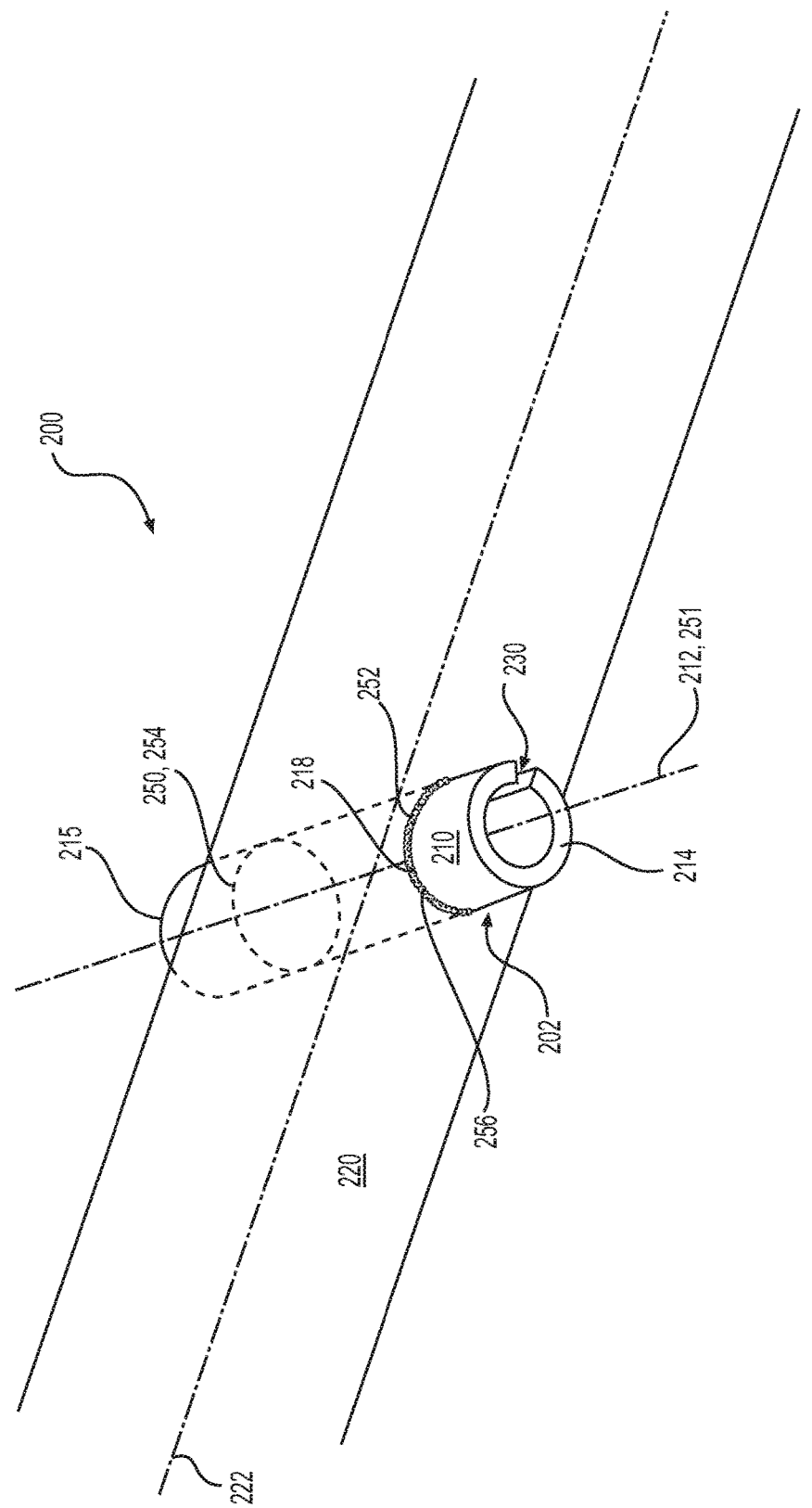
FIG. 4A is a perspective view, taken from a top and front, of another portion of the frame assembly of FIG. 1 showing, in isolation, two frame members in an assembled configuration.
Figure 4B:
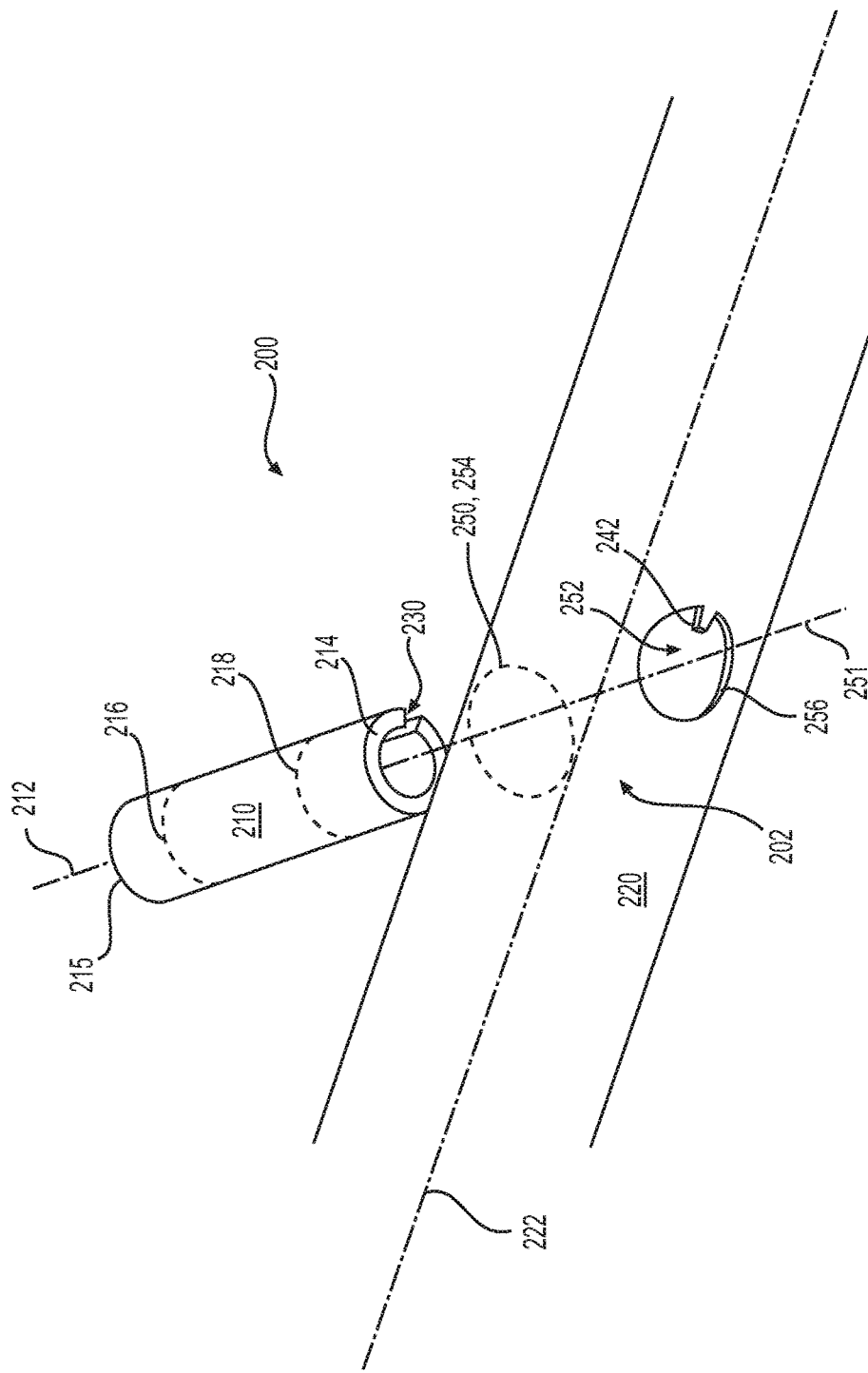
FIG. 4B is a perspective view, taken from a top and front, of the portion of the frame assembly of FIG. 4A, with the two frame members shown in a disassembled configuration.
Figure 4C:
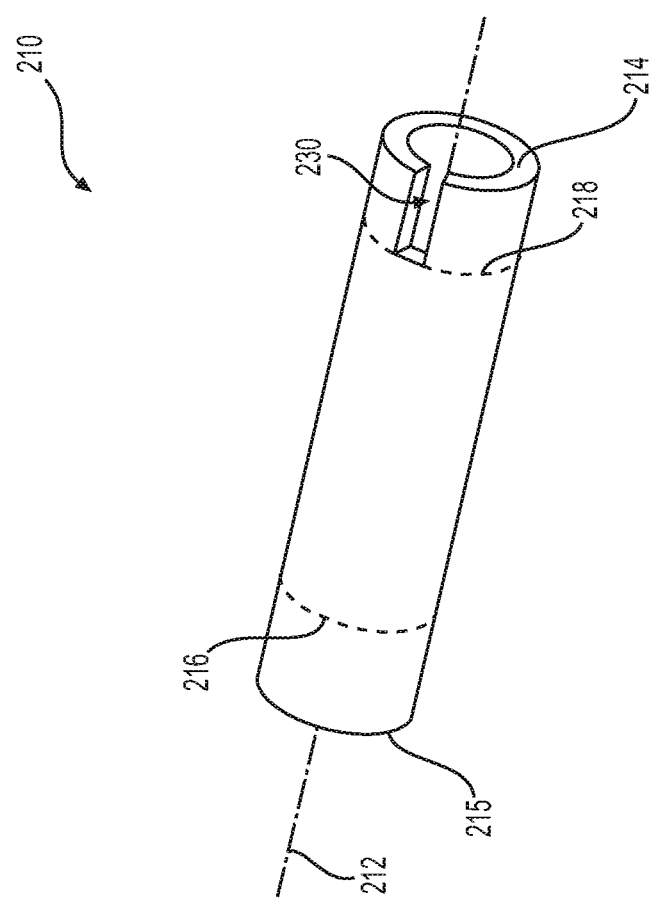
FIG. 4C is a perspective view of one of the frame members of the portion of the frame assembly of FIG. 4A shown in isolation.

With reference to FIGS. 4A to 4C, the frame assembly 200 and a method of assembling the frame assembly 200 will now be described. The frame assembly 200 includes a frame member 210 connected to a frame member 220 in a connection region 202. A frame member connection portion 218 of the frame member 210 is connected to the frame member connection portion 256 of the frame member 220, thereby defining the connection region 202 of the frame assembly 200.

With reference to FIG. 4C, the frame member 210 is tubular and cylindrical. The frame member 210 has a central axis 212, or a frame member axis 212. A slot 230 extends from an end 214 of the frame member 210. The slot 230 is linear and extends parallel to the frame member axis 212.

With reference to FIG. 4B, the frame member 220 is tubular and cylindrical, with a central axis 222, or a frame member axis 222. The diameter of the frame member 220 is greater than that of the frame member 210. The frame member 220 has two openings 250, 252 defined in its cylindrical wall. Each of the openings 250, 252 is configured to receive the cylindrical frame member 210 therethrough. The respective centers of the openings 250, 252 are disposed diametrically opposite each other with respect to the frame member axis 222. The openings 250, 252 define an openings axis 251 passing through the frame member axis 222 and the respective centers of both openings 250, 252. A projection 242 of the frame member extends into the opening 252. The projection 242 is formed continuously with the cylindrical wall of the frame member 220. The projection 242 extends radially with respect to the opening axis 251.

With reference to FIG. 4A, the frame member extends through the openings 250, 252 such that the frame member axis 212 is disposed coaxially with the opening axis 251 and the projection 242 of the frame member 220 is received in the slot 230 of the frame member 210. The projection 242 is disposed at the closed end of the slot 230. The portion 218 of the curved outer surface of the frame member 210 disposed adjacent the end of the slot 230 abuts the rim 256 of the opening 252 and is welded thereto. The rim 254 of the opening 250 (shown schematically in dotted lines) is also welded to the frame member 210 at a portion 216 of the curved outer surface abutting the rim 254. The portions 216, 218 of the frame member 210 form the frame member connection portions. The rims 254, 256 of the openings 250, 252 respectively of the frame member 220 form the frame member connection portions.

In the illustrated implementation of the frame assembly 200, the axes 212 and 251 are disposed perpendicular to the frame member axis 222 in the connection region 202. It is however contemplated that the axes 212, 252 could be disposed at an angle other than perpendicular to the frame member axis 222. In this case, the centers of the openings 250, 252 would be disposed on opposite sides of the frame member axis 222 but not diametrically opposite each other with respect to the frame member axis 222.

In the illustrated implementation, the frame members 210, 220 extend generally straight throughout the entire length. In other words, the entire length of the respective frame member axes 212, 222 forms a single straight line. It is however contemplated that a portion the frame member 220 could be curved or bent such that the frame member axis 222 is curved or bent along a section thereof.

It is contemplated that one or both of the frame members 210, 220 could not be cylindrical, and have a cross-section that is other than circular. For example, one or both of the frame members 210, 220 could have an elliptical or a rectangular cross-section. It is also contemplated that one or both of the frame members 210, 220 could not be tubular. For example, one or both of the frame members 210, 220 could be in the form of a beam having a C-shaped cross-section, an I-shaped cross-section or the like.

The method of assembling the frame assembly 200 will now be described with reference to FIGS. 4A to 4C.

The end 214 of the frame member 210 is inserted through the frame member 220 through the opening 250, and then out through the opening 252. The frame member 210 is thus inserted along the direction of the opening axis 251 and the frame member axis 212. Before the end 214 is inserted through the opening 252, the frame member 210 is rotated about the frame member axis 212 to align the slot 230 with the projection 242. When the projection 242 is received in the slot 230, the frame member 210 is prevented from rotating about the frame member axis 212. The insertion of the frame member 210 along the opening axis direction is limited by the projection 242 abutting the end of the slot 230. When the projection 242 abuts the end of the slot 230, the frame member 210 is positioned for connection with respect to the frame member 220. The frame member connection portion 216 is then welded to the frame member connection portion 254, and the frame member connection portion 218 is welded to the frame member connection portion 256. It is contemplated that the frame members 210, 220 could be fixed to each other using fasteners, adhesives or the like, instead of being welded together. The frame assembly 200 described above does not need the use of a jig for positioning the frame members 210, 220 before they are connected to each other.

In the illustrated implementation, the opening 250 does not have a projection similar to the projection 242 of the opening 252. It is contemplated that the slot 230 could be longer than as shown herein, and that the end 214 of the frame member 210 could be inserted into the frame member 220 through the opening 252 and out thereof through the opening 250 such that the end 215 without the slot 230 is disposed near the end 250 having the projection 242.

It is contemplated that the opening 250 could have a projection similar to the projection 242 of the opening 252. It is contemplated that the projections of both openings 250, 252 could be aligned with each other in the circumferential direction with respect to the opening axis 251 and frame member axis 212. The circumferentially aligned projections of the openings 250, 252 would be received in the slot 230 which would be longer than that shown in FIGS. 4A and 4C. It is also contemplated that the frame member 210 could have two slots extending from the end 214 and spaced apart from each other in a circumferential direction of the frame member 210, with each slot receiving a corresponding one of the projections of a corresponding one of the openings 250, 252. The circumferentially spaced slots of the frame member 210 and the corresponding circumferentially spaced projections of the opening 250, 252 would ensure that the frame member 210 could be inserted through the frame member 220 only in one direction along the axis 251.

It is contemplated that, instead of having the slot 230, the frame member 210 could have a flat machined onto the outer cylindrical surface and at least one of the openings 250, 252 would accordingly have a straight edge portion corresponding the flat of the frame member 210.

It is also contemplated that a projection 242 could be formed on the frame member 210, and that a corresponding complementary slot 230 could be formed adjacent the opening 250 and/or 252 in the frame member 220. For example, the projection 242 could be formed extend radially outward from the outer surface of the frame member 210.

In the illustrated implementation, the frame member 210 is a cylindrical member having a uniform diameter along its entire length from the end 214 to the opposite end 215. It is also contemplated that a portion of the frame member 210 adjacent one of ends 214, 215 could have a smaller diameter than the portion adjacent the other of the ends 214, 215. The openings 150, 152 would be configured accordingly to receive therethrough the smaller or larger diameter portion of the frame member 210. It will also be understood that the frame member 210 would then be inserted into the frame member 220 through the one of the openings 250 or 252 that is configured to receive therethrough the larger diameter portion of the frame member 210.

It is further contemplated that the opening 250 could be omitted and that the frame member 220 could have only the opening 252 having the projection 242. In this case, the frame member 210 would be inserted into the frame member 220 by inserting the end 214 into the frame member 220 via the opening 252.

With reference to FIGS. 5A and 5B, a frame assembly 300 similar to the frame assembly 200, and a method of assembling the frame assembly 300, will now be described.

The frame assembly 300 includes a first frame member 310 similar to the frame member 210, and a second frame member 320 similar to the frame member 220. Features of the frame assembly 300 that are similar to the corresponding features of the frame assembly 200 have been labeled with the same reference numbers as in the frame assembly 200 except that, in the place of the first digit, "2" has been replaced with "3". The frame assembly 300 will only be discussed in detail below with regard to differences with the frame assembly 200.

The slot 330 has a first portion 332 extending inwardly from the end 314 and a second portion 334 extending inwardly from the first portion 332 in a direction away from the end 314. The width 336 of the first portion 332 is greater than the width 338 of the second portion 334. The width of the slot 330 changes discontinuously between the first portion 332 and the second portion 334 so as to form a shoulder 340. The presence of the two separate portions 332, 334 allows the frame member 310 to be used with the second frame member 320 of the frame assembly 300 and the second frame member 420 of the frame assembly 400 as will be described below.

The frame members 310, 320 are assembled similarly and also without a jig as the frame members 210, 220 of the frame assembly 200. The projection 342 of the second frame member 320 is received in the narrower second portion 334 of the slot 330 so as to abut the end of the slot 330. The portion 344 of the curved outer surface of the frame member 310 disposed adjacent the end of the slot 330 abuts the rim 356 of the opening 352 and is welded thereto. The rim 354 of the opening 350 (shown schematically in dotted lines) is welded to the frame member 310 at a portion 348 of the curved outer surface abutting the rim 354. The portions 344, 348 form the frame member connection portion of the frame member 310 and the rims 354, 356 form the frame member connection portion of the frame member 320.

With reference to FIGS. 5C and 5D, a frame assembly 400 similar to the frame assembly 300, and a method of assembling the frame assembly 400, will now be described. The frame assembly 400 includes the first frame member 310 described above, and a second frame member 420 similar to the frame member 220, 320. Features of the frame member 420 that are similar to the corresponding features of the frame member 320 have been labeled with the same reference numbers as in the frame assembly 300 except that, in the place of the first digit, "3" has been replaced with "4". The frame assembly 400 will only be discussed in detail below with regard to differences with the frame assembly 300.

The projection 442 of the second frame member 420 is wider (width measured in a circumferential direction) than the projection 342 of the frame member 320. The width of the projection 442 is greater than the width 338 of the second portion 334 of the slot 330 and smaller than the width 336 of the first portion 332.

In the illustrated implementation, the frame members 320, 420 are both tubular and cylindrical and have the same diameter, but it contemplated that the frame members 320, 420 could have different diameters, and that one or both of the members 320, 420 could not be cylindrical and/or tubular.

The frame members 310, 420 are assembled similarly as the frame member 310, 320 of the frame assembly 300. The projection 442 of the second frame member 420 is received in the wider first portion 332 of the slot 330 so as to abut the shoulder 340. Thus, in the frame assembly 300, the end 314 of the first frame member 310 extends further past the rim 356 than in the frame assembly 400 with respect to the rim 456. The rim 456 of the opening 452 abuts the portion 342 of the curved outer surface of the frame member 310 disposed adjacent the shoulder 340 and is welded thereto. The rim 454 of the opening 450 (shown schematically in dotted lines) is welded to the frame member 310 at a portion 346 of the curved outer surface abutting the rim 454. The portions 342, 346 form the frame member connection portion of the frame member 310 and the rims 454, 456 form the frame member connection portion of the frame member 420. As will be understood, the relative positions of the connection portions 346 and 348 could be different than as shown herein and would depend in general on the relative diameter of the tubular frame members 320, 420, and the angle of insertion of the frame member 310, 410.

The slot 330 having two separate portions 332, 334 allows the frame member 310 to be used with the second frame member 320 of the frame assembly 300 as well as the second frame member 420 of the frame assembly 400. Each of the second frame members 320, 420 can of course also be used with a respective first frame member similar to the frame member 210 having a slot 230 that is dimensioned to accommodate the corresponding projection 342 or 442. However the frame member 310 having the slot 330 allows for a reduction of the number of different types of parts manufactured by eliminating the need for manufacturing two different types of frame members 210. Manufacturing a single frame member 310 usable with both frame members 320, 420 results in a reduction of complexity, time and cost in manufacture and assembly compared to the manufacture and assembly of two separate types of frame members 210, one usable with the frame member 320, and the other usable with the frame member 420.

It is contemplated that the slot 330 could have more than two portions 332, 334. It is also contemplated that the slot 330 could be formed to have a progressively decreasing width in a direction proceeding further away from the end 314. A slot 330 having more than two slot portions, or having a slot having a progressively decreasing width, would enable the frame member 310 to be usable with more than two types of frame members, each type having a corresponding width of projection. It is also contemplated that any of the frame members 310, 320, 420 could be other than tubular and/or cylindrical frame members.

To achieve greater precision than would be obtained by stamping, the slots 230, 330 the projections 242, 342, 442 and the openings 250, 252, 350, 352 described above are created by laser-cutting the corresponding shapes into the tubular cylindrical frame member. It is however contemplated that any of these above-mentioned structures could be created by other suitable methods.

With reference now to FIGS. 6A and 6B, a frame assembly 500, and a method of assembling the frame assembly 500 will now be described.

The frame assembly 500 includes a frame member 510 connected to another frame member 520. A frame member connection portion 526 of the frame member 520 is connected to a frame member connection portion 516 of the frame member 510, thereby defining the connection region 502 of the frame assembly 500.

The frame member 510 is tubular and cylindrical. The frame member 510 has two slots 530 and a circular opening 535 for connection of the frame member 520. Each of the slots 530 extends in a circumferential direction. The slots 530 are spaced from each other in an axial direction of the frame member 510, and the opening 535 is spaced from both slots 530 in a circumferential direction. In the axial direction, the position of the opening 535 is centered between the two slots 530.

The frame member 520 is a U-shaped bracket having two arms 540 connected together by a generally planar portion 542. One end 524 of the frame member 520 is disposed on the curved outer surface of the frame member 110 and welded thereto as will be described below. Each of the arms 540 therefore forms a curved end surface 525 at the end 524 that is congruous with the curved outer surface of the frame member 510. The end surfaces 525 would be planar for connection to a planar surface of the frame member.

As can be seen in FIG. 6B, the end surfaces 525 of the frame member 520 extend in a circumferential direction when disposed on the outer surface of the frame member 510. The left end surface 525 is connected to the frame member 510 along a circumferentially extending connection portion 544 adjacent the left slot 530, and the right end surface 525 is connected to the frame member 510 along a circumferentially extending connection portion 544 adjacent the right slot 530. The end portion of the inward facing surface (surface facing towards the arms 540) of the planar portion 542 is disposed on the outer surface of the frame member 510. The edge 527 of the planar portion 542 is connected to the frame member 510 along an axially extending connection portion 544 of the frame member 510. In the illustrated implementation therefore, as can be seen in FIG. 6A, the frame member connection portion 526 of the second frame member 520 is formed by the two curved end surfaces 525 of the arms 540 and the edge 527 of the planar portion 542. As can be seen in FIG. 6A, the frame member connection portion 516 of the first frame member 510 is formed by the left circumferentially extending portion 544, the axially extending portion 546, and the right left circumferentially extending portion 544.

As can be seen in FIG. 6A, each end surface 525 of the frame member 520 has a corresponding hook-like projection 550 (only the left projection 550 being seen in the Figures) that is received in a corresponding one of the slots 530 of the frame member 510 when assembled together (as in FIG. 6B). In the illustrated implementation, the right projection (not shown) is similar to the left projection 550. As such, only the left projection 550 will be described herein. The projection 550 is L-shaped. A first portion 550a of the projection 550 extends outwardly away from the end surface 525 to a second portion 550b, and the second portion 550b extends away from the first portion 550a in a direction generally parallel to the end surface 525. The second portion 550b of the projection 550 is thus spaced from the end surface 525. The projection 550 extends through the slot 530 such that the first portion 550a is disposed in the slot 530, and the curved end surface 525 and the second portion 550b of the projection 550 are disposed on opposite sides of the cylindrical wall of the frame member 510 adjacent the end of the slot 530 so as to retain therebetween the cylindrical wall of the frame member 510 adjacent the end of the slot 530. The curvature of the second portion 550b of the projection 550 matches the curvature of the wall of the frame member 510 adjacent the slot 530. It is contemplated that the projection 550 could have a different shape than as shown herein. For example, the projection 550 could be T-shaped instead of L-shaped.

As can be seen in FIG. 6A, the planar portion 542 has a circular opening 555 near the edge 527. When each projection 550 is received in the corresponding slot 530, the opening 555 is aligned with the opening 535 of the frame member 510. The frame assembly 500 also includes a rivet 560 used to assemble the members 510, 520 as will be described below. The rivet 560 is a removable blind rivet but it is contemplated that the rivet 560 could be any suitable rivet or other fastener.

The method of assembling the frame assembly 500 will now be described with reference to FIGS. 6A and 6B. The frame member 520 is moved with respect to the frame member 510 to insert the projections 550 of the frame member 520 into the corresponding slots 530 of the frame member 510. The frame member 520 is then moved with respect to the frame member 510 to place the end portion of the planar portion 542 on the curved surface of the frame member 510. The frame members 510, 520 are now in place for connection to each other. A portion of the wall of the frame member 510 adjacent each slot 530 is held between second projection portion 555b and the end surface 525 of the corresponding arm 540 to hold the frame members 510, 520 in place for connection. A rivet 560 is then inserted through the aligned openings 535, 555 to lock the frame members 510, 520 to each other. The curved end surface 525 and the edge 527 of the frame member 520 (which form the frame member connection portion 526) are then welded to the frame member connections portions 544, 546 with the frame members 510, 520 being held locked in position by the rivet 560 and the projections 550 received in the slots 530. In the illustrated implementation, the rivet 560 is removed after the frame members 510, 520 are welded together but it is contemplated that the rivet 560 could be left in place after the frame members 510, 520 are welded to each other. It is also contemplated that a fastener other than the rivet 560 could be used to lock the frame members 510, 520 in place for welding.

The frame assembly 500 described above does not need the use of a jig for positioning and holding the frame members 510, 520 in their respective positions before they are connected to each other. The rivet 560 secures the frame members 510, 520 together in place for connection and thereby provides accurate alignment. In the illustrated implementation, the slots 530 are each covered by the end surfaces of the corresponding arm 540. The weld is formed continuously along the regions 546, 544 without any gaps along the weld contributing to the rigidity and strength of the frame assembly 500.

With reference now to FIGS. 7A and 7B, a frame assembly 600, and a method of assembling the frame assembly 600 will now be described.

The frame assembly 600 includes a first frame member 610 connected to another frame member 620. A frame member connection portion 626 of the frame member 620 is connected to a frame member connection portion 616 of the frame member 610, thereby defining the connection region 602 of the frame assembly 600.

The frame member 610 is tubular and cylindrical. The frame member 610 has a neutral axis 612. The neutral axis 612 is an axis in the body of the frame member 610 along which there is no stress or strain. The frame member 620 is in the form of a generally planar and triangular bracket. An edge 624 of the planar surface of the frame member 620 is disposed on the curved outer surface of the frame member 610 and connected thereto along the neutral axis 612. The connection portion 616 of the frame member 610 is therefore disposed along the neutral axis 612 except in two small regions 618 as will be described below. The connection portion 626 of the frame member 620 is formed by the edge 624.

As can be seen in FIG. 7A, the tubular frame member 612 has two circular openings 630, each opening 630 being disposed along the neutral axis 612.

The edge 624 of the frame member 620 is generally straight except in two spaced apart portions 640 that protrude outwardly away from the opposite edge of the frame member 620. The frame member 620 has an opening 642 disposed just inwardly of each edge portion 640. Each opening 642 is in alignment with the straight portion of the edge 624 (i.e. a straight line containing the straight portions of the edge 626 would pass through the openings 642). The distance between the openings 642 corresponds to the distance between the openings 630 so that the frame member 620 can be disposed on the frame member 610 such that each opening 642 is aligned with a corresponding one of the openings 630.

The frame members 610, 620 are assembled without a jig. For assembling the frame assembly 600, the frame member 620 is disposed along the tubular frame member 610 so as to align the openings 642 with the openings 630. A first rivet 650 is inserted through the left one of the aligned openings 630, 642 and a second rivet 650 is inserted through the right one of the aligned openings 630, 642 to lock the frame members 610, 620 to each other in place for connection. The entirety of the edge 624 including both portions 640 is then welded to the frame member connection portion 616.

A majority of the weld (frame member connection portion 616) extends along the neutral axis 612. Each portion 618 of the connection portion 616 which is welded to a corresponding one of the edge portions 640 is disposed outside the neutral axis 612. The majority of the weld is disposed along the neutral axis 612 to reduce the amount of stress and strain that the weld is subjected to and so that the portion of the frame member 610 that has the weld formed therein, is not a portion subjected to large compression or tension forces during use, thereby increasing the robustness and strength of the frame assembly 600. In addition, the openings 630 are disposed along the neutral axis to reduce the probability of a fracture starting at the location of either of the openings 630. The weld extends slightly away from the neutral axis 612 around the openings 630 in order to be formed continuously without any gaps. The continuously formed weld also contributes to the strength and robustness of the frame assembly 600.

It is contemplated that the frame member 620 could be connected to two (or more) frame members such as the frame member 610. For example, the portion of the edge 624 around one of the openings 642 could be connected to a first frame member 610, and the portion of the edge 624 around the other opening 642 could be connected to a second frame member (not shown). The frame member 620 could thus be used to connect the first frame member 610 to the second frame member (not shown).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A frame assembly for a vehicle comprising:
a first frame member comprising a first frame member wall and defining a first frame member axis, the first frame member wall having a slot extending therethrough and having a first frame member connection portion adjacent the slot; and
a second frame member comprising a second frame member wall and defining a second frame member axis, the second frame member wall having a projection and a second frame member connection portion adjacent the projection,
the projection extending through the slot,
the first frame member connection portion being connected to the second frame member connection portion to form a connection region,
the second frame member axis being disposed at a non-zero angle with respect to the first frame member axis in the connection region.

2. The frame assembly of claim 1, wherein the projection is one of: linear, T-shaped and L-shaped.

3. The frame assembly of claim 1, wherein the projection extending through the slot is disposed at a closed end of the slot.

4. The frame assembly of claim 1, wherein:
the slot is a first slot;
the projection is a first projection;
one of the first and second members comprises a second slot extending through a corresponding one of the first frame member wall and the second frame member wall; and
the other of the first and second members comprises a second projection extending through the second slot and being spaced from the first projection.

5. The frame assembly of claim 1, wherein the first frame member connection portion is welded to the second frame member connection portion.

6. The frame assembly of claim 1, wherein:
the second frame member connection portion is an end surface of the second frame member; and
the projection extends from the end surface in a direction parallel to the second frame member axis.

7. The frame assembly of claim 6, wherein the second frame member connection portion circumscribes the slot of the first frame member.

8. The frame assembly of claim 7, wherein:
the first frame member wall defines an opening extending therethrough, the second frame member connection portion circumscribing the opening;
the slot is a first slot;
the projection is a first projection;
the first frame member comprises a second slot extending through the first frame member wall;
the second frame member comprises a second projection extending through the second slot and disposed spaced from the first projection; and
the second frame member connection portion circumscribes the opening, the first slot and the second slot.

9. The frame assembly of claim 1, wherein:
the second frame member is tubular;
the second frame member defines a first opening extending through the second frame member wall and a second opening extending through the second frame member wall, the first and second openings being disposed on opposite sides with respect to the second frame member axis;
the projection of the second frame member extends into the first opening;
the slot of the first frame member extends from an end of the first frame member;
the first frame member extends through the first and second openings such that the projection extends through the slot; and
a rim of each of the first and second openings is connected to the first frame member by welding.

10. A method of assembling a frame assembly comprising a first frame member having a first frame member axis and a first frame member wall and a second frame member having a second frame member axis and a second frame member wall, the method comprising:
inserting a projection of the second frame member through a slot extending through the first frame member wall of the first frame member;
contacting a first frame member connection portion of the first frame member wall with a second frame member connection portion of the second frame member wall to form a connection region, the first and second frame members being thereby positioned for connection with the second frame member axis disposed at a non-zero angle with respect to the first frame member axis in the connection region; and
after positioning the first and second frame members for connection, connecting the first frame member connection portion to the second frame member connection portion.

11. The method of claim 10, wherein:
when the first frame member connection portion is connected to the second frame member connection portion, the second frame member connection portion circumscribes the slot.

12. The method of claim 11, wherein:
when the first frame member connection portion is connected to the second frame member connection portion, the second frame member connection portion circumscribes an opening defined through the first frame member wall.

13. The method of claim 12, wherein:
the opening is formed continuously with the slot; and
inserting the projection through the slot comprises:
    placing the projection in the opening; and
    moving the projection from the opening into the slot.

14. The method of claim 13, wherein connecting comprises welding.

15. The method of claim 10, wherein inserting the projection through the slot comprises engaging the first frame member with the second frame member.

16. The method of claim 10, further comprising:
after inserting the projection through the slot and before connecting the first frame member connection portion with the second frame member connection portion, moving the projection along the slot.

17. The method of claim 16, wherein the projection is moved along the slot until the projection is disposed at an end of the slot.

18. The method of claim 16, wherein:
the slot is a first slot;
the projection is a first projection;
one of the first and second frame members comprises a second slot extending through a corresponding one of the first frame member wall and the second frame member wall; and
an other of the first and second frame members comprises a second projection,
the method further comprising:
    after moving the first projection along the first slot and before connecting the first frame member connection portion with the second frame member connection portion,
        inserting the second projection through the second slot.

19. The method of claim 10, wherein:
the slot is a first slot;
the projection is a first projection;
one of the first and second frame members comprises a second slot extending through a corresponding one of the first frame member wall and the second frame member wall; and
an other of the first and second frame members comprises a second projection,
the method further comprising:
    after inserting the first projection through the first slot and before connecting the first frame member connection portion with the second frame member connection portion,
        moving the second frame member with respect to the first frame member to align the second projection with the second slot; and
        after aligning the second projection with the second slot, inserting the second projection through the second slot.

20. The method of claim 10, wherein inserting the projection of the second frame member through the slot of the first frame member comprises:
moving the second frame member with respect to the first frame member, in an insertion direction parallel to one of:
the first frame member axis; and
the second frame member axis.

* * * * *

UNITED STATES PATENT AND TRADEMARK OFFICE
CERTIFICATE OF CORRECTION

PATENT NO. : 9,815,145 B2
APPLICATION NO. : 14/930273
DATED : November 14, 2017
INVENTOR(S) : Bruno Larocque et al.

Page 1 of 1

It is certified that error appears in the above-identified patent and that said Letters Patent is hereby corrected as shown below:

On the Title Page

In item (72) Inventors, the names of the following inventors should added:
-- Eric Milot, El Paso, TX (US); Jean St-Louis, El Paso, TX (US); Claude Juneau, El Paso, TX (US) --

Signed and Sealed this
Nineteenth Day of February, 2019

Andrei Iancu
*Director of the United States Patent and Trademark Office*